United States Patent
Wada

(10) Patent No.: US 9,769,246 B2
(45) Date of Patent: Sep. 19, 2017

(54) INFORMATION PROCESSING TERMINAL AND CONTROL METHOD

(71) Applicant: CANON KABUSHIKI KAISHA, Tokyo (JP)

(72) Inventor: Katsuhiro Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 14/463,562

(22) Filed: Aug. 19, 2014

(65) Prior Publication Data

US 2015/0058395 A1 Feb. 26, 2015

(30) Foreign Application Priority Data

Aug. 23, 2013 (JP) .................................. 2013-173228

(51) Int. Cl.
*G06F 15/16* (2006.01)
*H04L 29/08* (2006.01)
*G06F 9/54* (2006.01)

(52) U.S. Cl.
CPC ................ *H04L 67/10* (2013.01); *G06F 9/54* (2013.01); *G06F 9/541* (2013.01)

(58) Field of Classification Search
CPC ... H04L 41/5083; H04L 67/10; H04L 67/141; H04L 67/16; G06F 9/547; G06F 17/30893
See application file for complete search history.

(56) References Cited

U.S. PATENT DOCUMENTS

| 2007/0162604 A1* | 7/2007 | Murakami | G06Q 40/00 709/226 |
| 2007/0268517 A1* | 11/2007 | Koarai | G06F 3/1204 358/1.15 |
| 2009/0260005 A1* | 10/2009 | Nakagawa | H04L 67/34 709/223 |
| 2011/0270954 A1* | 11/2011 | Kikkawa | H04L 12/2812 709/219 |
| 2012/0254902 A1 | 10/2012 | Brown et al. | |
| 2013/0185386 A1* | 7/2013 | Hashida | G06F 17/30241 709/217 |

FOREIGN PATENT DOCUMENTS

| CN | 1910610 A | 2/2007 |
| CN | 102238176 A | 11/2011 |
| CN | 102906742 A | 1/2013 |
| JP | 2003-296435 A | 10/2003 |

OTHER PUBLICATIONS

Extended European search report for European Application No. 14181120.8—1957/2840500, dated Apr. 5, 2016.

* cited by examiner

*Primary Examiner* — Liangche A Wang
*Assistant Examiner* — Ayele Woldemariam
(74) *Attorney, Agent, or Firm* — Canon USA, Inc. I.P. Division

(57) ABSTRACT

In an information processing terminal, a web browser, if instructed by a user to call a function for specific data managed by a client, identifies second function information for adapting the specific data to a type processable by a first function called by using first function information belonging to a category corresponding to the function called by a user's instruction. The web browser issues a request for processing the specific data processed with a second function called by using the identified second function information, with the first function, and receives a processing result of the requested processing.

10 Claims, 23 Drawing Sheets

FIG.3

```
<intent
  action="http://webintents.org/share"
  type="image/*"
  href="share.html"
  title="Share image using e-mail"
  disposition="window"
/>
```

FIG.4

```
document.getElementById('share-photo').addEventListener(
    "click", function(){
    var intent = new Intent(
        {"action":"http://webintents.org/share",
        "type":"image/jpeg",
        "data":getImageFrom(···)});
    navigator.startActivity(intent, onSuccess);
}, false);
```

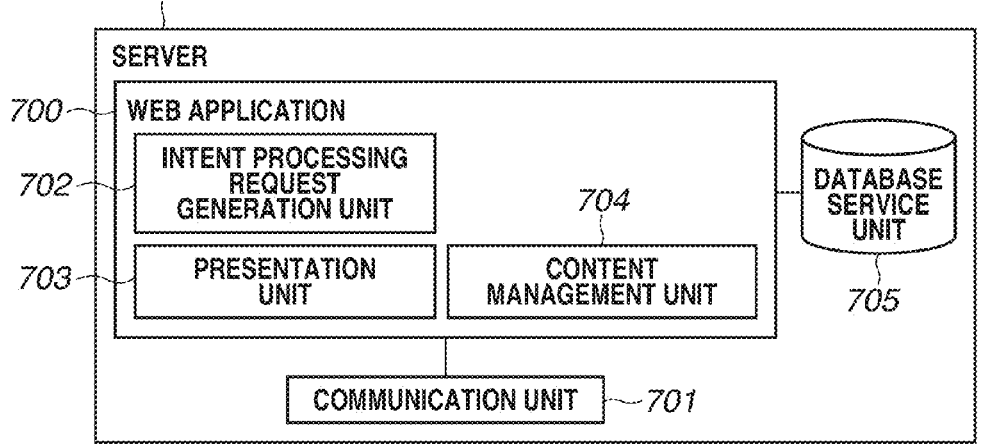
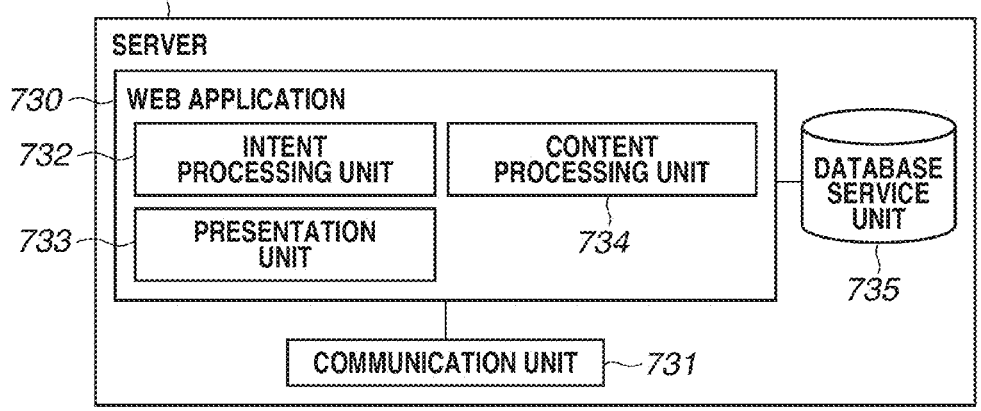
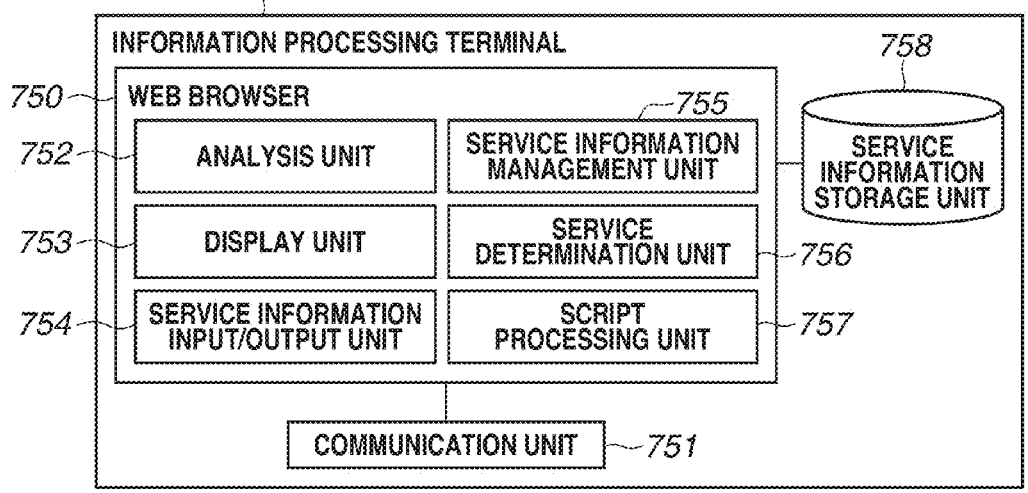

FIG.8A

800 REGISTERED SERVICE TABLE

| Service ID _801_ | action _802_ | type _803_ | href _804_ | title _805_ | disposition _806_ |
|---|---|---|---|---|---|
| 1 | share | image/jpeg | http://www/aaa_share.html | AAA Share Service | window |
| 2 | edit | image/* | http://www/bbb_edit.html | bbb Edit Service | inline |
| 3 | share | image/jpeg | http://www/bbb_share.html | BBB Share Service | window |
| 4 | share | image/* | http://www/ccc_share.html | CCC Share Service | window |
| 5 | pick | image/* | http://www/aaa_pick.html | aaa Pick Service | window |

FIG.8B

820 CONTENT MANAGEMENT TABLE

| Image ID _821_ | File _822_ |
|---|---|
| 1 | image001.png |
| 2 | image002.png |

FIG.10A

```
document.getElementById('share-photo').addEventListener(
"click", function(){
 var intent = new Intent(
{"action":"http://webintents.org/share",
    "type":"image/png",
        "data":getImageFrom(…)
    }
   );
    navigator.startActivity(intent, onSuccess);
}, false);

…… document.getElementById('edit-photo').addEventListener(
"click", function(){
 var intent = new Intent(
{"action":"http://webintents.org/edit",
    "type":"image/*",
        "data":getImageFrom(…)
    }
   );
    navigator.startActivity(intent, onSuccess, onError);
}, false);
```

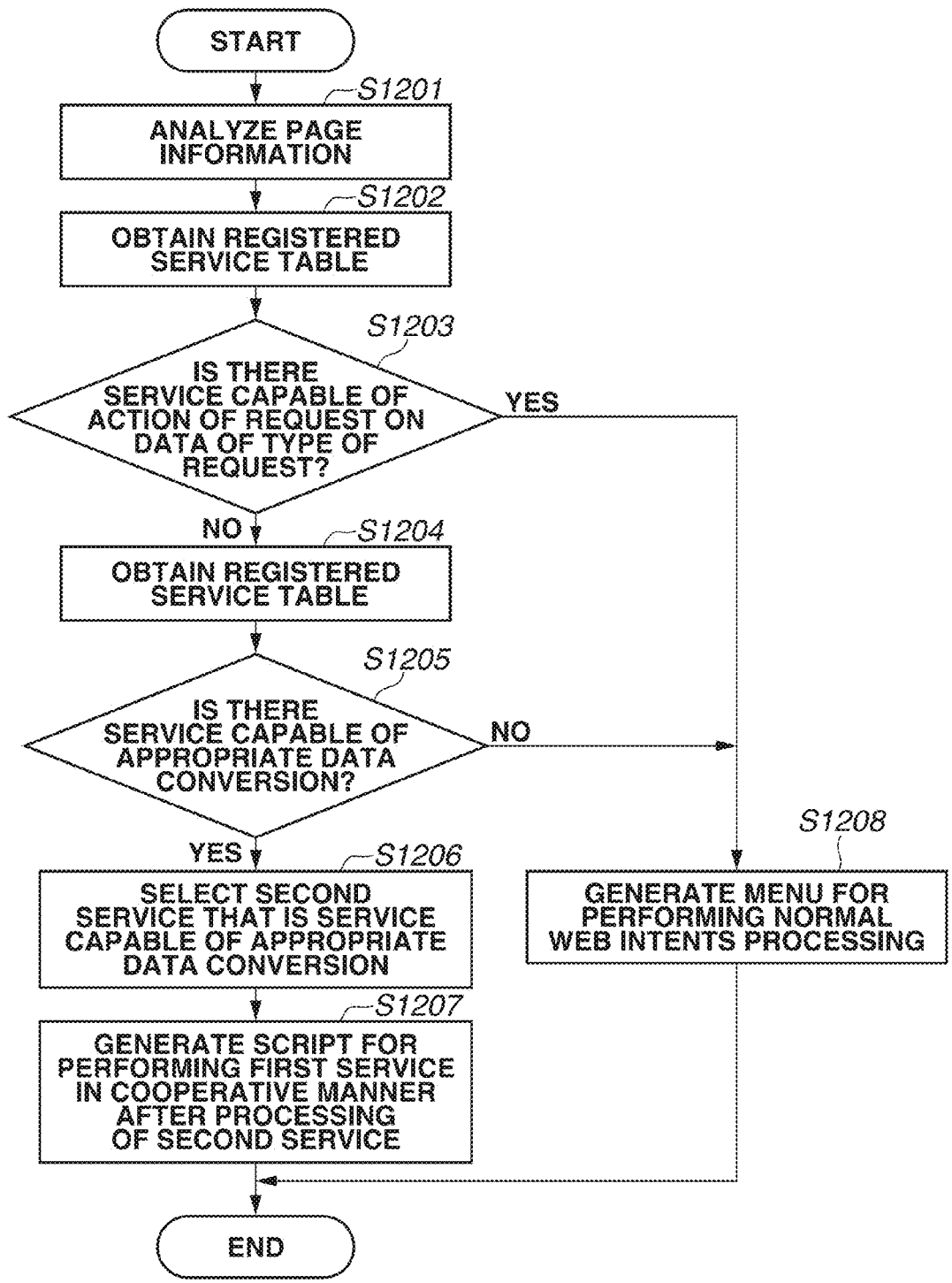

FIG.15B

```
           document.getElementById('share-photo').addEventListener(
1550 ─         "click", function(){
               var intent = new Intent(
                   {"action":"http://webintents.org/edit",
                    "type":"image/*",
                      "title":"bbb Edit Service"
                      "data":getImageFrom(Image001.png),
1551 ─             "extra":{
                          "ForwardAction":["http://webintents.org/share"],
                          "ForwardType":["image/jpeg"],
                   1552 { "ForwardTitle":["aaa Share Service"],
                          "ForwardHref":["aaa_share.html"],
                          "ForwardDisposition":["Window"],
                          "ForwardBaseURL":["http://aaa.com"]}});
               navigator.startActivity(intent, onSuccess);
           }, false);
```

FIG.18

| Service ID | action | type | href | title | disposition | Registration Date | Count |
|---|---|---|---|---|---|---|---|
| 1 | share | image/jpeg | http://www/aaa_share.html | AAA Share Service | window | 2012/10/1 | 30 |
| 2 | edit | image/* | http://www/bbb_edit.html | bbb Edit Service | inline | 2012/12/1 | 4 |
| 3 | share | image/jpeg | http://www/bbb_share.html | BBB Share Service | window | 2012/10/10 | 23 |
| 4 | share | image/* | http://www/ccc_share.html | CCC Share Service | window | 2012/12/20 | 12 |
| 5 | edit | image/* | http://www/aaa_edit.html | aaa Edit Service | window | 2012/10/1 | 56 |

*800 REGISTERED SERVICE TABLE*

FIG.19

WEB INTENT EXECUTION LOG

| Log ID | action | type | href | title | disposition | Registration Date | Transaction | Input data type | Status |
|---|---|---|---|---|---|---|---|---|---|
| 1 | edit | image/jpeg | http://www/aaa_edit.html | aaa Edit Service | window | 2012/10/1, 10:12:21 | 1 | image/jpeg | Success |
| 2 | share | image/png | http://www/bbb_share.html | BBB Share Service | window | 2012/10/1, 10:12:55 | 1 | image/jpeg | Error |
| 3 | edit | image/* | http://www/bbb_edit.html | bbb Edit Service | inline | 2012/10/1, 10:14:01 | 2 | image/png | Success |
| 4 | share | image/png | http://www/bbb_share.html | BBB Share Service | window | 2012/10/1, 10:14:43 | 2 | image/jpeg | Success |
| 5 | share | image/jpeg | http://www/bbb_share.html | BBB Share Service | window | 2012/10/1, 10:22:22 | 3 | image/jpeg | Success |

1901 1902 1903 1904 1905 1906 1907 1908 1909 1910

INFORMATION PROCESSING TERMINAL AND CONTROL METHOD

BACKGROUND OF THE INVENTION

Field of the Invention

The present invention relates to a technique for using services that uses a mechanism of Web Intents.

Description of the Related Art

Conventionally, when a website delegates processing to another website, a function calling side needs to know how to call a function providing side. Examples include an application program interface (API) and a representational state transfer (REST) interface of the function providing side. To cooperate with different websites, the function calling side therefore needs to perform necessary processing according to respective calling rules.

In order for the function calling side to use the function, authentication by the function providing side is often needed. The user side of the function thus needs to retain authentication information about the function providing side and/or use an authentication basis such as Security Assertion Markup Language (SAML). If authentication information is obtained, proper, safe management of the authentication information is required. The use of a SAML or other authentication basis needs a prior agreement between the provider and user of the function, which has imposed a burden on the user of the function.

There are also mechanisms for cooperating with an arbitrary web service (or web application) without using a dedicated API. As an example, a mechanism called Web Intents has been discussed which loosely couples the receiving side and the providing side of a service by late runtime binding, thereby implementing cooperation therebetween.

Japanese Patent Application Laid-Open No. 2003-296435 discusses a technique for dynamically controlling a plurality of server management units and a plurality of server providing units according to intentions of both.

Through the mechanism of Web Intents, it is possible to select and use a Web Intents service that provides a specific action and a processable type. However, there is a problem in that a Web Intents client cannot use a Web Intents service that is unable to process the type of data the Web Intents client provides. It should be noted that Japanese Patent Application Laid-Open No. 2003-296435 does not take into account a mechanism for the cooperation of Web Intents.

SUMMARY OF THE INVENTION

The present invention is directed to providing a mechanism that enables use of a desired service by easily making a plurality of services cooperate without troubling the user even if the type of data a client managing data provides is different from that of data the service can process.

According to an aspect of the present invention, an information processing terminal having a relay function of making a client which manages data and a service which provides a function using the data managed by the client cooperate with each other via a network, includes a registration unit configured to perform registration processing for registering function information for calling the function provided by the service, with the relay function, an identification unit configured to, if instructed by a user to call a function for specific data managed by the client, identify second function information from the function information registered by the registration unit, the second function information for calling a second function being intended to adapt the specific data to a processable type of first function information registered by the registration unit, the first function information belonging to a category corresponding to the function called by a user's instruction, a request unit configured to issue a request for processing the specific data processed with the second function called by using the identified second function information, with a first function called by using the first function information, and a reception unit configured to receive a result of the processing requested by the request unit.

Further features of the present invention will become apparent from the following description of exemplary embodiments with reference to the attached drawings.

BRIEF DESCRIPTION OF THE DRAWINGS

FIG. 3 is a diagram for describing a hypertext markup language (HTML) document for registering a Web Intents function.

FIG. 4 is a diagram for describing an HTML document sent back from a client to a user agent (UA).

FIGS. 7A, 7B, and 7C are diagrams illustrating an example of a software configuration of the servers and the information processing terminal.

FIGS. 8A and 8B are diagrams illustrating an example of a registered service table and a content management table according to a first exemplary embodiment.

FIGS. 10A and 10B are diagrams for describing a screen of the client displayed by the UA.

FIG. 12 is a flowchart illustrating an example of processing of the UA for making a plurality of services cooperate.

FIGS. 15A and 15B are diagrams for describing processing of a server according to the second exemplary embodiment.

FIG. 18 is a diagram illustrating an example of a registered service table according to a third exemplary embodiment.

FIG. 19 is a diagram illustrating an example of a Web Intent execution log according to the third exemplary embodiment.

DESCRIPTION OF THE EMBODIMENTS

Various exemplary embodiments, features, and aspects of the invention will be described in detail below with reference to the drawings.

<Basic Overall Conceptual Diagram>

Figure 1:
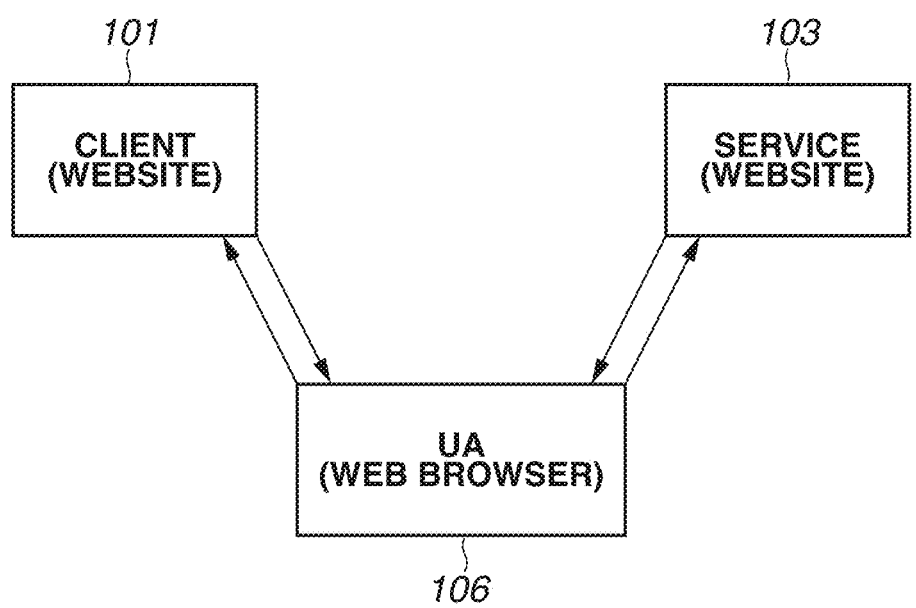
FIG. 1 is a diagram illustrating an example of an overall configuration for implementing Web Intents.

A first exemplary embodiment of the present invention will be described below. FIG. 1 is a diagram illustrating an example of an overall configuration for implementing Web Intents. Web Intents is an example of the mechanism for cooperating with an arbitrary web service (or web application) without using a dedicated API.

A Web Intents service (hereinafter, referred to as a service) 103 provides services and functions by using a Web Intents technique. A Web Intents client (hereinafter, referred to as a client) 101 uses the service 103. A UA 106 functions to pass a request from the client 101 to the server 103 and pass a result from the service 103 to the client 101. The UA 106 can be seen as a relay function for executing a request and transferring data between the client 101 and the service 103. A Web Intent, which is function information for calling a function provided by the service 103, is registered in the UA 106.

For example, the client 101 is a website which manages data and in which a button for calling the service 103 is disposed. The client 101 runs on a web server. The UA 106 is a web browser which displays the website. The UA 106 runs on an information processing terminal such as a personal computer. The service 103 is a website which accepts and processes the data managed by the client 101 via the UA 106 and with which the client 101 cooperates. The service 103 runs on a web server.

As a specific example, suppose that the mechanism of Web Intents is applied to a social networking service (SNS). The client 101 is a website in which social buttons such as "like," "check," and "share" are disposed. The UA 106 is a web browser which displays the website. The service 103 is a posting website which accepts posting of a photograph or comment managed by the client 101 and builds a browsing site when the social buttons are pressed. If user authentication or a user's operation is needed for the service 103 to provide a function, the user makes the operation from the UA 106.

Aside from a web browser, the UA 106 may be implemented by an operating system (OS) or an arbitrary application running on the information processing terminal as long as the OS or application has a function of cooperating with the service 103 to be described below. Examples of the information processing terminal includes a personal computer, a smartphone, a tablet computer, and a car navigation apparatus.

Aside from a service provider on the Internet like the foregoing posting service, devices such as a built-in camera of the information processing terminal, an image forming apparatus, and a scanner may serve as the service provider of the service 103. Examples of the service provider corresponding to the service 103 may further include peripheral devices such as an image forming apparatus, a scanner, and a network camera connected with the UA 106 via a network, and web services provided by home electric appliances such as a refrigerator and a television set.

Similarly, the client 101 as a requestor that calls the service 103, may include various devices and applications installed in the information processing terminal. Further, peripheral devices and home electric appliances on the network, and programs running on such devices and appliances can be the user that calls the service 103.

An arbitrary combination of the client 101, the UA 106, and the service 103 may operate within the same system. Specifically, a document editing application having similar functions to those of a web browser may function as a configuration including the client 101 and the UA 106.

A hardware configuration of the apparatuses that provide the functions of the client 101, the UA 106, and the service 103 will be described below with reference to FIG. 6.

<Web Intents Sequence Diagram and Example of Data>

Figure 2:
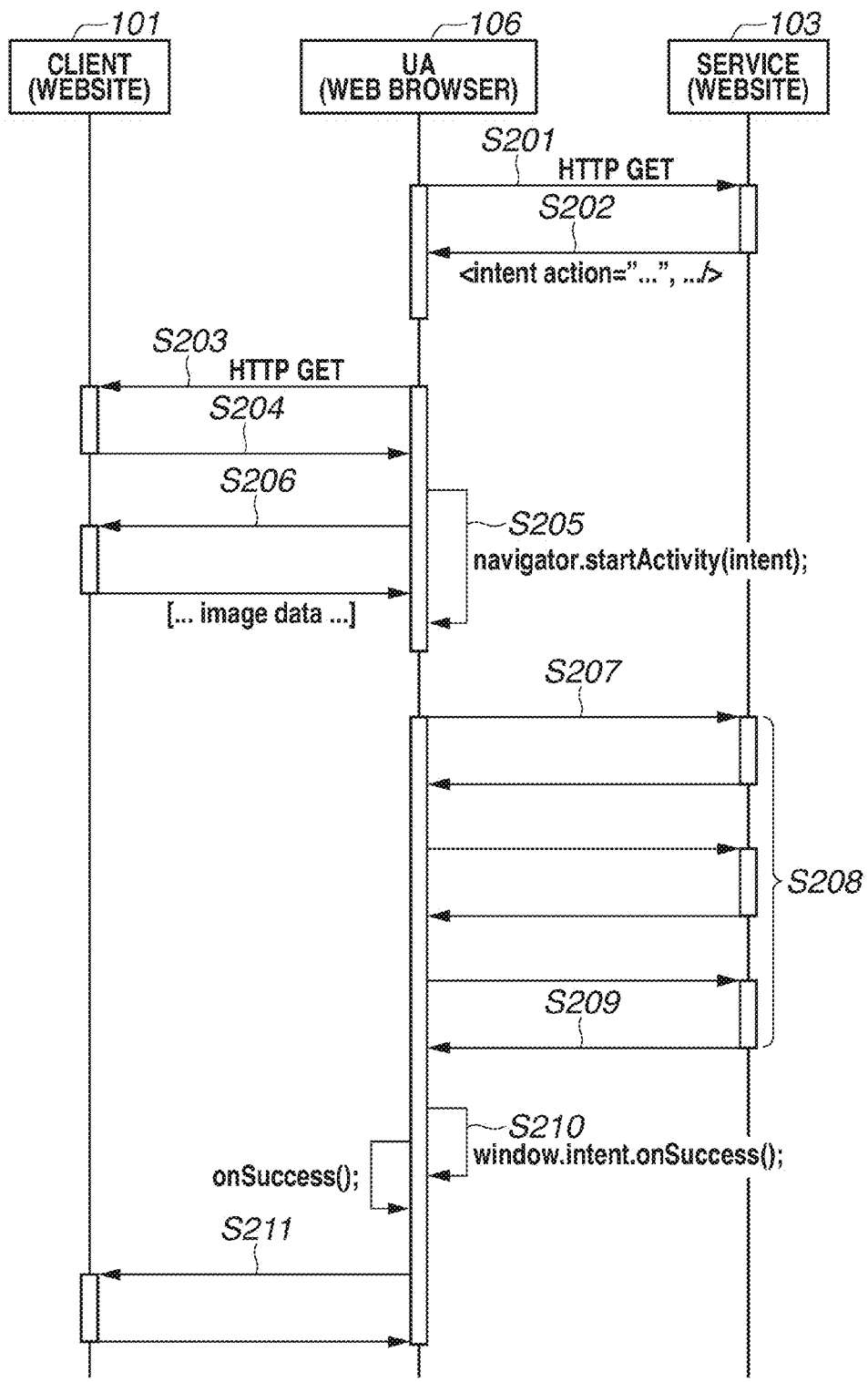
FIG. 2 is a sequence diagram illustrating a basic operation related to the provision of a service using Web Intents.

FIG. 2 is a sequence diagram for describing a basic operation related to the provision of a service using Web Intents.

In step S201, the UA 106 accesses the service 103 according to the user's operation. In step S202, the service 103 sends back an HTML response to the UA 106. The HTML response includes a registration markup for making the UA 106 register a function to be provided. The contents of the HTML response sent back from the service 103 to the UA 106 will be described by using the example of FIG. 3.

FIG. 3 is a diagram for describing an HTML document for registering a Web Intents function. In FIG. 3, information for identifying the provided function is written in an <intent> tag. action indicates a category of the provided function. type indicates a type of data that the provided function can handle. href indicates a connection destination (universal resource locator (URL)) of the provided function. title indicates a title of the provided function. disposition indicates how the provided function is displayed when called.

In the example of FIG. 3, the category of the provided function is "share." The type of the data that can be handled is "image data (image) in all formats (*)." The connection destination is "share.html" and the title is "Share image using e-mail." It indicates that such a function is displayed in another window (window) via the UA 106.

Examples of the category of the provided function include share, edit, view, pick, subscribe, save, and browser. Share represents data sharing. Edit represents data editing. View represents viewing of data. Pick represents acquisition of data from an external service. Subscribe represents data subscription. Save represent saving of data.

Upon receiving the response of step S202, the UA 106 inquires the user whether to register the function provided by the service 103 in the UA 106. For example, if the UA 106 is a web browser, the UA 106 displays a popup window and prompts the user to select whether to register. If the user selects to register the provided function as a Web Intent, the UA 106 performs registration processing for storing the information received in step S202 in the inside. Specifically, the information is stored in a storage area of the information processing terminal on which the UA 106 runs, and registered as a Web Intent in the UA 106.

In step S203, the UA 106 accesses the client 101 according to an operation of the user's operation. In step S204, the client 101 sends back an HTML document describing the use of the provided function (Web Intent) of the service 103, to the UA 106. For example, if the website serving as the client 101 displays an image and a "share" button, the website sends back an HTML document including ECMAScript such as illustrated in FIG. 4 to the UA 106. The contents of the HTML document sent back from the client 101 to the UA 106 will be described by using the example of FIG. 4. FIG. 4 is a diagram for describing the HTML document sent back from the client 101 to the UA 106.

As illustrated in FIG. 4, the ECMAScript indicates that the specified anonymous function is executed when the user clicks a button having an identifier (ID)="share-photo" in the HTML document. The anonymous function initially generates a new Intent object and calls the startActivity( ) function with the new Intent object as an argument. When the function is executed, the UA 106 extracts Web Intents having action and type coincident with those of the specified Intent object from among Web Intents registered in the UA 106. The UA 106 displays a list of the extracted Web Intents to request the user to select. The getImageFrom( ) function called in the anonymous function is executed to obtain image data retained in the client 101.

In step S204, the client 101 sends back an HTML document to the UA 106. For example, the HTML document includes an image, a "share" button, and the ECMAScript illustrated in FIG. 4. The UA 106 receives the HTML response from the client 101, and displays the received contents to the user. In step S205, the UA 106 detects that the "share" button on the display screen is pressed by the user, and executes the ECMAScript for activating Web Intents as described above. In step S206, the UA 106 obtains image data retained in the client 101. When the "share" button is detected to be pressed in the foregoing step S205, the UA 106 displays a list of Web Intents registered in the UA 106. If the Web Intent representing the providing function of the service 103 is detected to be selected from the list by the user, then in step S207, the UA 106 transmits a hypertext transfer protocol (HTTP) request to the selected service 103. Here, the UA 106 includes the contents of the Intent object generated by the ECMAScript illustrated in FIG. 4 into the transmission data.

In step S208, the service 103 extracts the Intent object from the HTTP request of step S207, and implements the use of the selected providing function (here, "sharing" of the image data of the client 101) through interaction with the user via the UA 106. For example, suppose that the user visits a website including an image and a share button, and presses the share button. In such a case, the service 103 displays a list of services in a popup window. If the user selects a web mail service, the service 103 generates a new mail with the image data attached, and the user can transmit the email.

The service 103 ends the processing, and in step S209, sends back a response including ECMAScript for notifying the client 101 of a processing result. In step S210, the UA 106 executes the ECMAScript included in the response of step S209, and calls the callback function onSuccess( ) specified as an argument in the startActivity( ) function of step S205. In step S211, the UA 106 sends back the processing result to the client 101 by using the callback function onSuccess( ).

By the foregoing processing, the client 101 can call the function or service of the Web Intent provided by the service 103 (in this example, "sharing" of the image) via the UA 106.

An example of using a web mail function will be described based on the sequence of FIG. 2. The user initially operates the web browser (UA 106) to visit the website in which a Web Intents call button of the web storage (client 101) managing photographic data is provided, and presses the button. The web browser (UA 106) then displays a popup window including a list of registered services. If the user selects the web mail function, the website (service 103) providing the function is displayed in another window. A new mail with the photographic data attached is generated on the window as the processing result.

By the foregoing processing, the client 101 can call the Web Intents function provided by the service 103 (in this example, "sharing" of an image) via the UA 106.

<Configuration Example of Network, Peripheral Devices, and Network Services of Present Exemplary Embodiment>

Figure 5:
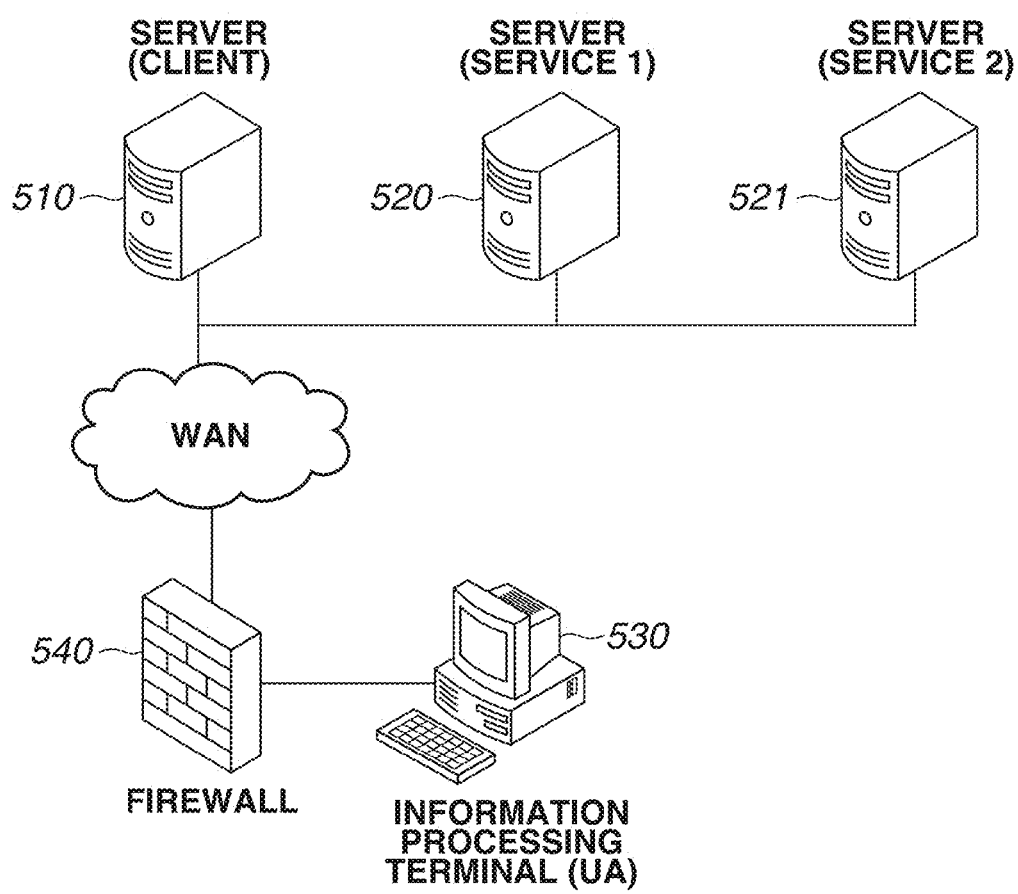
FIG. 5 is a diagram illustrating an example of configuration of a system according to an exemplary embodiment of the present invention.

FIG. 5 is a diagram illustrating an example of configuration of a server system which illustrates an exemplary embodiment of the present invention. The present server system includes an information processing terminal 530, a server 510 which provides the function(s) of one or more clients 101, and one or more servers 520 and 521 which provide services 103. The information processing terminal 530 is connected by a local area network (LAN), and connected over a firewall 540 to the servers 510, 520, and 521 via a wide area network (WAN) such as the Internet.

In the present exemplary embodiment, the two servers (the server 520 and the server 521) are used to provide two services (service 1 and service 2) corresponding to the service 103 described above. However, a single server may provide a plurality of service functions. Even in such a case similar processing can be performed by the configuration discussed here.

The server 510 provides the function of the client 101 described above. The server 510 generates processing requests for services 1 and 2. The servers 520 and 521 include a web application for providing the functions of services 1 and 2 corresponding to the service 103 described above, and provide services and functions by using the Web Intents technique. The information processing terminal 530 is a computer in which a web browser for providing the function of the UA 106 described above is installed. The servers 510, 520, and 521, and the information processing terminal 530 have a configuration of a general-purpose computer.

In the present exemplary embodiment, the information processing terminal 530 is described to be a general-purpose computer. An exemplary embodiment of the present invention is similarly applicable even if the information processing terminal 530 is implemented with a different configuration. Examples include an information processing terminal of different configuration, a tablet computer, and a smartphone.

Figure 6:
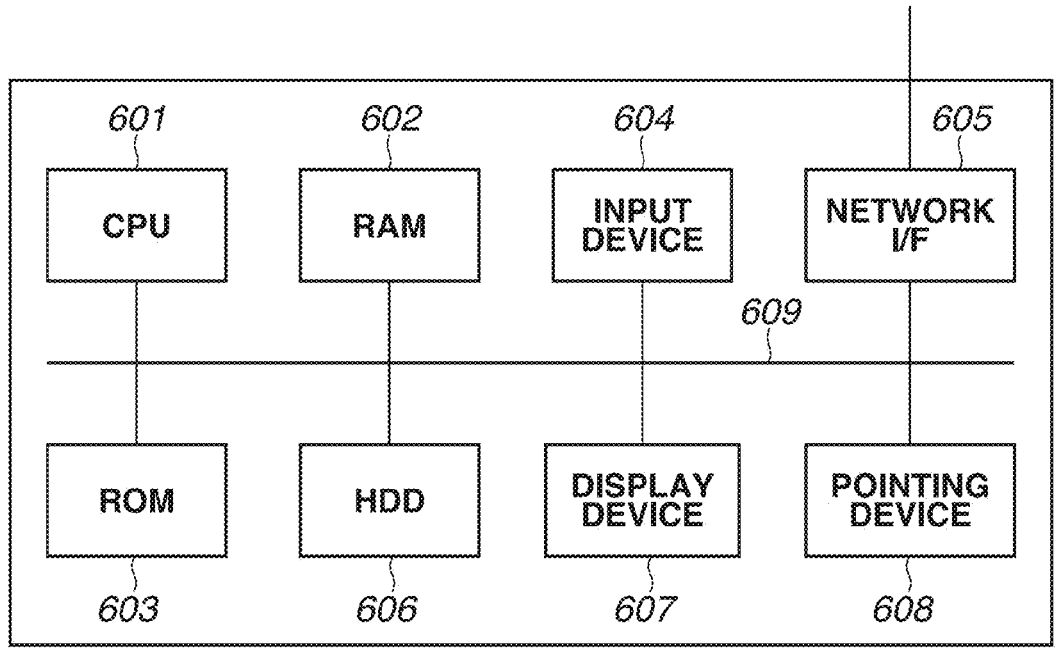
FIG. 6 is a diagram illustrating an example of a hardware configuration of servers and an information processing terminal.

FIG. 6 is a block diagram illustrating an example of a hardware configuration of the servers 510, 520, and 521, and the information processing terminal 530.

As illustrated in FIG. 6, a central processing unit (CPU) 601, a random access memory (RAM) 602, a read-only memory (ROM) 603, a network interface (network I/F) 605, and a hard disk drive (HDD) 606 are connected in a mutually communicable manner via a system bus 609. A display device 607 such as a liquid crystal display (LCD), an input device 604 such as a keyboard, and a pointing device 608 such as a mouse and a touch panel are also connected in a mutually communicable manner via the system bus 609.

A control program such as an operating system is stored in the ROM 603 or the HDD 606. The CPU 601 reads the control program from the ROM 603 or the HDD 606 onto the RAM 602 as needed and executes the control program, whereby functions as a computer are implemented. The CPU 601 displays various types of information via the display device 607, and accepts user instructions from the input device 604 and the pointing device 608. The CPU 601 further performs communication with other apparatuses via the network interface 605.

FIGS. 7A to 7C are block diagrams illustrating an example of a software configuration of the servers 510, 520, and 521, and the information processing terminal 530.

FIG. 7A illustrates an example of the software configuration of the server 510 which provides the function of the client 101.

The server 510 includes a web application 700 and processing units which exist as files stored in the HDD 606 of the server 510. The web application 700 and the processing units are program modules which are each loaded into the RAM 602 at the time of execution and executed by the OS and/or other processing units that use the processing unit.

The web application 700 is an application that provides, for example, a storage service for storing image data. The web application 700 is implemented as a program that performs processing in response to an HTTP request. The web application 700 includes an Intent processing request generation unit 702, a presentation unit 703, and a content management unit 704.

The Intent processing request generation unit 702 is a software module that generates ECMAScript which is an Intent processing request. The presentation unit 703 is a software module that generates an HTML document according to a page acquisition request received via a communication unit 701. The content management unit 704 is a software module that obtains and stores contents from/into the HDD 606 by using a database service unit 705 according to a request from the presentation unit 703.

The database service unit 705 is a software module that stores and extracts contents into/from the HDD 606 according to requests from other processing units. The database service unit 705 further manages a content management table 820 such as illustrated in FIG. 8B to be described below. The database service unit 705 may be provided on an apparatus other than the server 510. The CPU 601 of the server 510 reads the program modules from the HDD 606 onto the RAM 602 and executes the program modules, whereby the web application 700 described above is implemented.

FIG. 7B illustrates an example of the software configuration of the servers 520 and 521 which provide services 1 and 2 corresponding to the service 103.

The servers 520 and 521 each include a web application 730 and processing units which exist as files stored in the HDD 606 of the server 520 or 521. The web application 730 and the processing units are program modules which are each loaded into the RAM 602 at the time of execution and executed by the OS or other processing units that use the processing unit.

The web application 730 is an application that provides, for example, a storage service for storing image data. The web application 730 has a function of providing a service by using the Web Intents technique. The web application 730 is implemented as a program that performs processing in response to an HTTP request. The web application 730 includes an Intent processing unit 732, a presentation unit 733, and a content processing unit 734.

The Intent processing unit 732 is a software module that analyzes and processes an Intent object. The presentation unit 733 is a software module that generates an HTML document according to a page acquisition request received via a communication unit 731. The content processing unit 734 is a software module that receives instructions from the Intent processing unit 732 and performs processing on contents. For example, the content processing unit 734 is a software module that edits image data and stores contents in the HDD 606 via a database service unit 735 according to a request.

The database service unit 735 stores and extracts data according to requests from other processing units. The database service unit 735 further manages a content management table 820 such as illustrated in FIG. 8 to be described below. The database service unit 735 may be provided on an apparatus other than the servers 520 and 521. The CPU 601 of the server 520 or 521 reads the program modules from the HDD 606 onto the RAM 602 and executes the program modules, whereby the web application 730 described above is implemented.

FIG. 7C illustrates an example of the software configuration of the information processing terminal 530 which provides the function of the UA 106.

The information processing terminal 530 includes a web browser 750 and processing units which exist as files stored in the HDD 606 of the information processing terminal 530. The web browser 750 and the processing units are program modules which are loaded into the RAM 602 at the time of execution and executed by the OS and/or other processing units that use the processing unit.

The web browser 750 includes an analysis unit 752, a display unit 753, a service information input/output unit 754, a service information management unit 755, a service determination unit 756, and a script processing unit 757.

A communication unit 751 is a software module that receives a request from other processing units and transmits an HTTP request message to external apparatuses. The communication unit 751 further receives an HTTP response message from external apparatuses and notifies the analysis unit 752 of the contents of the HTTP response message.

The analysis unit 752 is a software module that analyzes an HTML document. The analysis unit 752 also analyses ECMAScript which is an Intent processing request. The display unit 753 is a software module that renders an HTML document. The display unit 753 further displays a screen for accepting selection of a service according to a request from other processing units.

The service information input/output unit 754 is a software module that analyses reception of the "action" of a Web Intents script and the "type" indicating data type and generates transmission data based on the ECMAScript analyzed by the analysis unit 752. The service information management unit 755 obtains and stores information for identifying a registered service or services from/into a service information storage unit 758 to be described below.

The service determination unit 756 determines whether a second service is needed in currently-running Web Intents processing, based on the "action" and "type" of a Web Intents script.

If the service determination unit 756 determines that a second service is needed, the script processing unit 757 performs processing for using the second service needed in the currently-running Web Intents processing based on the information stored in the service information storage unit 758. The service information storage unit 758 manages data, and stores and extracts data according to requests from the service information management unit 755. The service information storage unit 758 further retains a registered service table 800 such as illustrated in FIG. 8A to be described below. The CPU 601 of the information processing terminal 530 reads the program modules from the HDD 606 onto the RAM 602 and executes the program modules, whereby the web browser 750 described above is implemented.

FIGS. 8A and 8B are diagrams illustrating an example of the registered service table 800 and the content management table 820.

FIG. 8A illustrates an example of the registered service table 800 which the web browser 750 of the information processing terminal 530 stores in the service information storage unit 758 to manage the services registered within itself.

The registered service table (registered Web Intents service table) 800 is stored in the service information storage unit 758 of the information processing terminal 530, and managed by the service information management unit 755. Function information (801 to 806) for calling a function provided by a service is registered in the registered service table 800. A detailed description will be given below.

A service ID 801 is an ID for uniquely identifying a service in the Web browser 750. An action 802 indicates the category of the function to be provided by service 1 or service 2 (what function or service the service provides). A type 803 indicates the type of data that can be handled by the action 802.

An href 804 indicates the relative URL of service 1 or 2. A title 805 indicates the title of service 1 or 2. A disposition 806 indicates how service 1 or 2 is displayed. In other words, the information processing terminal 530 can issue an Intent processing request to each of services 1 and 2 by referring to the registered service table 800 via the web browser 750.

FIG. 8B illustrates an example of the content management table 820 which manages image data to be handled by the web applications 700 and 730 of the servers 510, 520, and 521.

The content management table 820 is stored in the HDDs 606 in the servers 510, 520, and 521, and managed by the database service units 705 and 735. An image ID 821 is an ID for uniquely identify image data in the web applications 700 and 730. A file 822 indicates the filename of the image data. The servers 510, 520, and 521 can obtain the image data from the HDD 606 and/or edit the image data with reference to the content management table 820 by using the content management unit 704 or the content processing unit 734.

An operation in which the information processing terminal 530 accesses the website provided by the server 510 and mediates Intent processing requests to services 1 and 2 provided by the servers 520 and 521 will be described with reference to the sequence diagram of FIG. 9.

Figure 9:
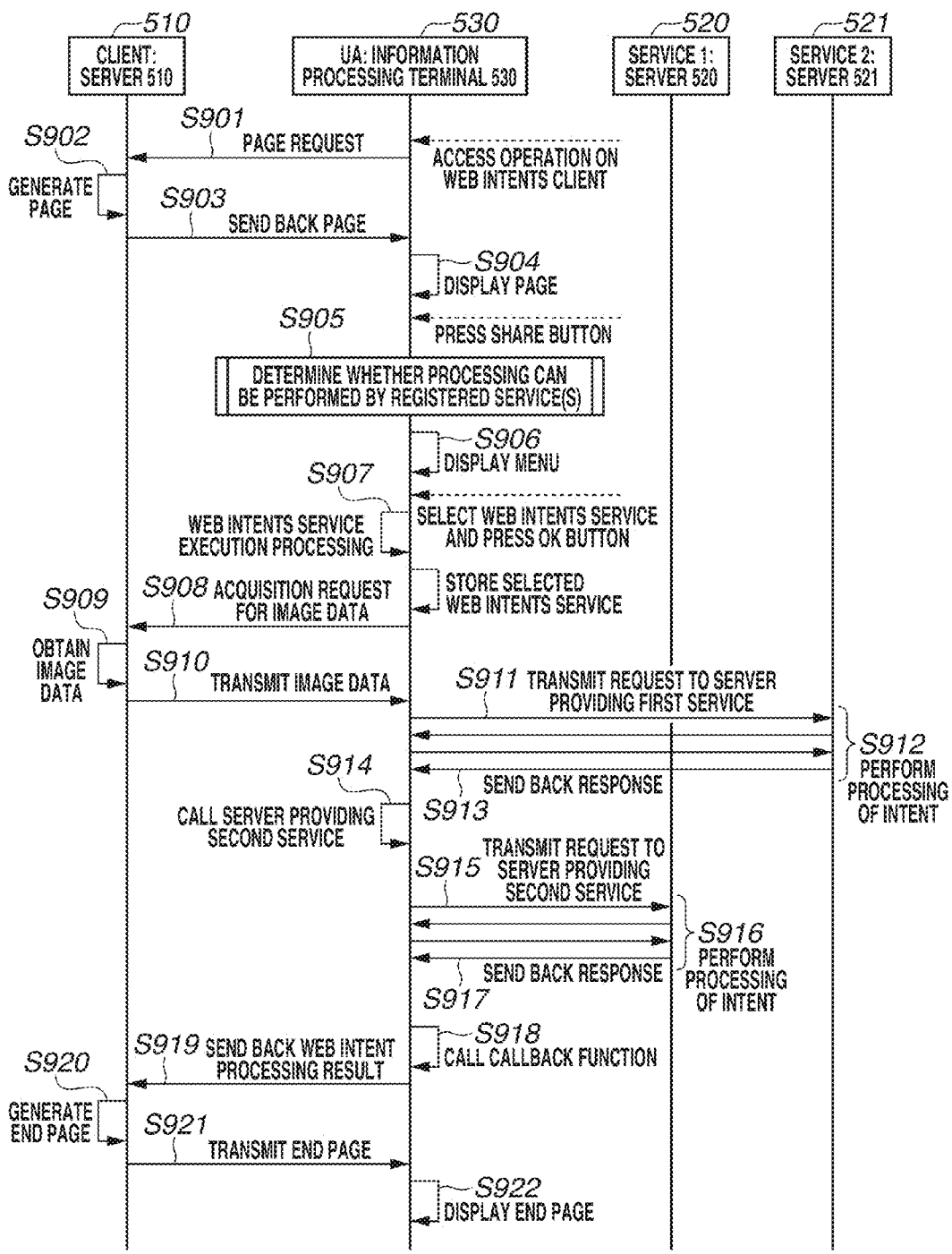
FIG. 9 is a sequence diagram illustrating an operation related to the provision of a service using Web Intents according to the first exemplary embodiment.

FIG. 9 is a sequence diagram illustrating an example of the operation related to the provision of a service using Web Intents according to the first exemplary embodiment.

The web browser 750 of the information processing terminal 530 initially accepts a user operation, and performs the processing of step S901. Examples of the user operation include inputting the URL of the web application 730 of the server 510 into an address bar. In step S901, the web browser 750 transmits a page request as an HTTP request message to the server 510 functioning as the client 101 via the communication unit 751.

The web application 700 of the server 510 receives the page request transmitted from the information processing terminal 530, and performs the processing of step S902. In step S902, the web application 700 of the server 510 generates a page. In step S903, the web application 700 of the server 510 sends back the page generated in step S902 to the web browser 750 of the information processing terminal 530 as an HTTP response message.

The web browser 750 of the information processing terminal 530 receives the page sent back from the server 510, and performs the processing of step S904. In step S904, the display unit 753 of the web browser 750 of the information processing terminal 530 displays the received page. Specifically, the analysis unit 752 analyzes the HTML document corresponding to the page, and the display unit 753 renders and displays the received page. A screen displayed in step S904 will be described with reference to FIGS. 10A and 10B.

Figure 10B:
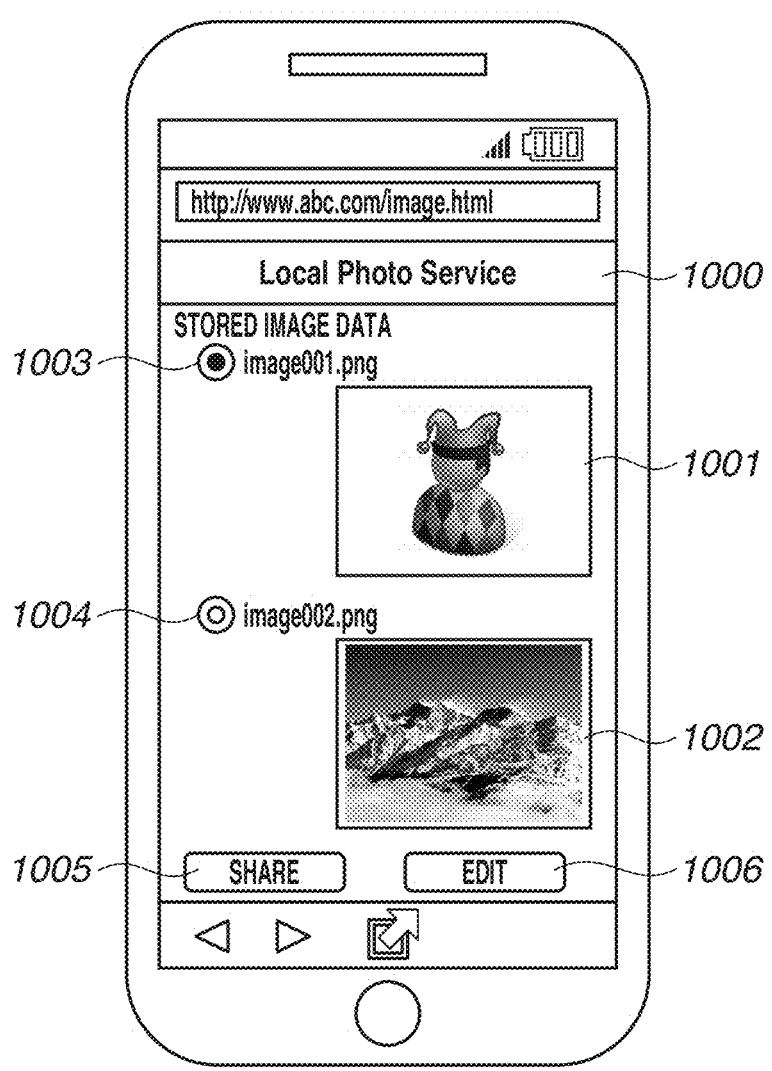

FIGS. 10A and 10B are diagrams for describing the screen displayed in step S904 of FIG. 9.

FIG. 10A illustrates an example of ECMAScript written in the HTML document that is generated by the web application 700 of the server 510 in step S902 and displayed by the web browser 750 of the information processing terminal 530 in step S904. The contents of FIG. 10A are the same as those described in FIG. 4. A detailed description thereof is thus omitted.

FIG. 10B illustrates an example of the screen displayed by the web browser 750 of the information processing terminal 530 in step S904.

A screen 1000 is the screen displayed by the display unit 753 of the web browser 750. Radio buttons 1003 and 1004 are configured to select image data 1001 and 1002 of "image001.png" and "image002.png," respectively.

A share button 1005 is configured to pass the image data selected by the radio button 1003 or 1004 to service 1 for sharing. An edit button 1006 is configured to pass the image data selected by the radio button 1003 or 1004 to service 2 for editing. An ID="share-photo" in the HTML document is assigned to the share button 1005. An ID="edit-photo" is assigned to the edit button 1006. When the web browser 750 of the information processing terminal 530 detects pressing of the button 1005 or 1006, the web browser 750 of the information processing terminal 530 executes the ECMAScript of FIG. 10A.

Return to the description of the sequence diagram in FIG. 9.

If the web browser 750 of the information processing terminal 530 detects that the share button 1005 (FIG. 10B) is pressed by the user, the web browser 750 of the information processing terminal 530 performs the processing of step S905. In step S905, the web browser 750 of the information processing terminal 530 refers to the registered service table 800, determines whether the processing corresponding to the share button 1005 can be performed by registered services, and determines the service which is to be listed on the display unit 753. The processing of step S905 is configured to perform processing through cooperation of a plurality of Web Intents services (for example, editing by service 2 and then sharing in service 1). The processing of step S905 will be described in detail with reference to FIG. 12.

FIG. 12 is a flowchart illustrating an example of the processing of step S905 in FIG. 9. This processing corresponds to the processing that the web browser 750 of the information processing terminal 530 performs. The processing is configured to perform a plurality of cooperative services.

In step S1201, the analysis unit 752 of the web browser 750 of the information processing terminal 530 analyzes the page information that is generated by the web application 700 of the server 510 serving as the client 101 in step S902 of FIG. 9 and sent back in step S903.

In step S1202, the web browser 750 obtains the registered service table 800 from the service information storage unit 758 via the service information management unit 755.

In step S1203, the service determination unit 756 of the web browser 750 determines whether the registered Web Intents services obtained in step S1202 include a service capable of taking the requested action on the requested type of data. More specifically, the service determination unit 756 initially determines whether there is a service (first service) capable of taking the requested action, among the registered Web Intents services. If there is a first service, the service determination unit 756 determines whether the first service can process the requested type of data. In such a manner, the service determination unit 756 determines whether there is a service capable of taking the requested action on the requested type of data.

Specifically, the present embodiment deals with a case where the user selects "image001.png" having an image file type of Portable Network Graphics (PNG) and presses the share button 1005. In the example of FIG. 8, the services having a service ID 801="1," "3," and "4" are determined to be first services capable of taking the requested action=share. The service determination unit 756 then determines the type 803, whereby only "CCC Share Service" with a type 803="image/*" and a service ID 801="4" is determined to be capable of the sharing processing= "image001.png." According to the determination result, the service determination unit 756 determines that there is registered a service coincident with the requested action and type (YES in step S1203), and advances the processing to step S1208 to be described below.

A case where the service having a service ID 801="4" is not registered will be described below. In such a case, based on the determination of the type 803, the service determination unit 756 determines that the services with a type 803="image/jpeg" and a service ID 801="1" and "3" are not capable of the sharing processing of the data having a type="image/png." That is, the services having a service ID 801="1" and "3" are determined not to be capable of performing the sharing processing of "image001.png." In such a case, based on the determination result, the service determination unit 756 determines that no service coincident with the requested action and type is registered (NO in step S1203), and advances the processing to step S1204.

If NO in step S1203, then in step S1204, the service determination unit 756 obtains the registered service table 800 from the service information storage unit 758 via the service information management unit 755. Here, the service determination unit 756 may obtain only services capable of data conversion from the registered service table 800.

In step S1205, the service determination unit 756 determines whether the registered Web Intents services obtained in step S1204 include a service that can convert the requested type of data into data of the type 803 of the first service. Specifically, the service determination unit 756 searches the registered services for a second service that can convert data of the requested type="image/png," into data of the first service corresponding to the type="image/jpeg," and makes the determination. In other words, the service determination unit 756 determines whether there is a service that can convert image data in a PNG format into image data in a Joint Photographic Experts Group (JPEG) format.

In the example of FIG. 8, the service having a service ID 801="2" (action 802=edit and type 802=image/*) is determined to be capable of performing processing for converting "image001.png" into image data having a type="image/jpeg." Based on the determination result, the service determination unit 756 determines that a second service capable of appropriate data conversion is registered (YES in step S1205), and advances the processing to step S1206 to be described below.

A case where the service having a service ID 801="2" is not registered will be described. In such a case, no service that can convert "image001.png" into data having a type "image/jpeg" is determined to be registered. Based on the determination result, the service determination unit 756 determines that no service capable of appropriate data conversion is registered (NO in step S1205), and advances the processing to step S1208 to be described below.

If YES in step S1205, then in step S1206, the web browser 750 selects the second service that is the data conversion service retrieved. In the foregoing example, "bbb Edit Service" with a service ID 801="2" is selected as the second service. In other words, the web browser 750 identifies the second service for adapting the requested data type (type) to the data type (type) processable by the first service corresponding to the requested action.

Figure 11A:
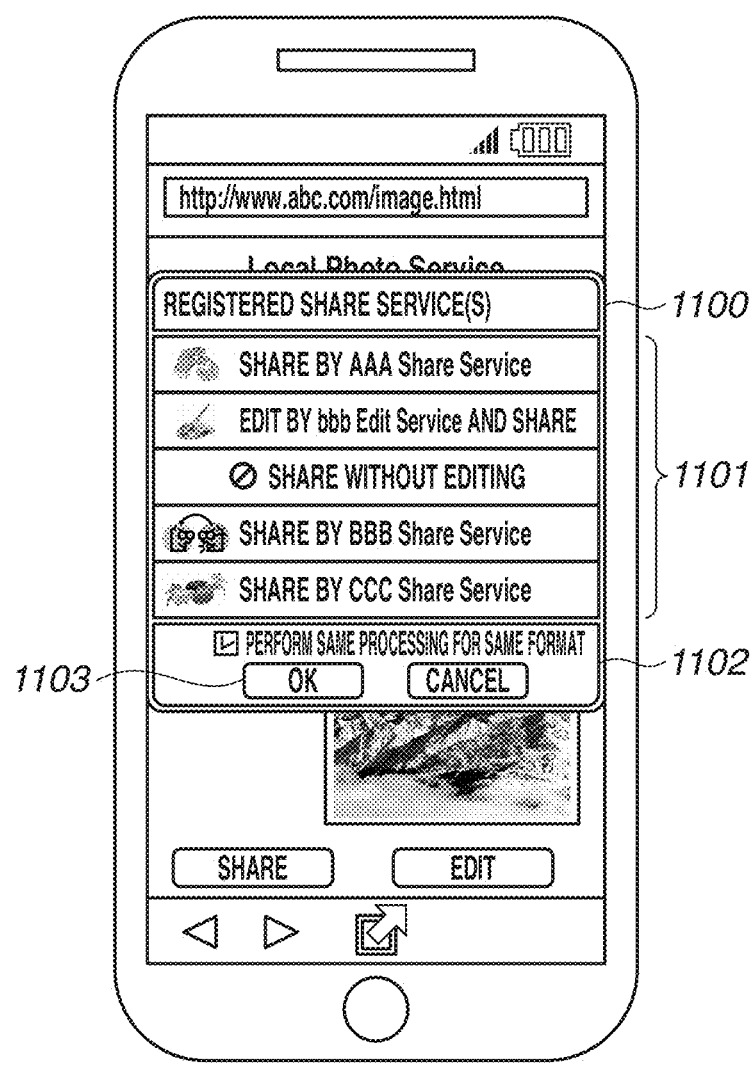
FIGS. 11A and 11B are diagrams illustrating an example of the screen when a share button is pressed.

In step S1207, the script processing unit 757 of the web browser 750 generates a script for performing the first service in a cooperative manner after the processing of the second service. The script processing unit 757 further generates an HTML file including a script for displaying and processing a menu in which the second service cooperates with the first service on the display unit 753 of the web browser 750. FIG. 11A illustrates a display example of the menu.

If YES in step S1203 or NO in step S1205, then in step S1208, the web browser 750 performs processing for generating a menu for performing normal Web Intents processing. More specifically, the web browser 750 generates a menu in which only one service coincident with the requested action and type is displayed as an option.

As described above, the present exemplary embodiment deals with the case where the share button 1005 is pressed. The target services are therefore those having a service ID 801="1," "3," and "4" with an action 802="share." The data to be "shared," or the contents "image001.png" and "image002.png" (822) stored in the Web Intents client (server 510), are image files in a "PNG" image format. The services having a service ID 801="1" and "3," of which the action 802 is "share," can only handle data having a type 803 of "image/jpeg," and are not applicable as a target service of the requested action, "share." Only the service having a service ID 801="4" has a type 803 of "image/*" and can serve as a target service for sharing the image in the "PNG" format. Conventionally, even if the user presses the share button 1005 in such a situation, the image file in the PNG format, i.e., the data having the unsupported type 803 such as "image001.png" has been unable to be shared by using the services having a service ID 801="1" and "3."

In the present exemplary embodiment, to "share" the image having a type 803="PNG" by using the service having a service ID 801="1" which the user usually uses, the image is initially "edited" by using a cooperative Web Intents service. To share the image by the "share" service having a service ID 801="1" according to instructions from the user, the web browser 750 performs image format conversion processing by the cooperating "edit" service and then performs sharing processing by the "share" service. In step S1207 of FIG. 12, the web browser 750 generates a script and a menu for executing such a service including a plurality of cooperating services.

The example illustrated in FIG. 12 has dealt with the case where if a service coincident with the requested action and type is registered (YES in step S1203), then in step S1208, the web browser 750 generates a normal menu without generating the foregoing menu of a plurality of cooperating services. However, the web browser 750 may generate the foregoing menu of a plurality of cooperating services even in such a case. For example, in the case of FIG. 8, the web browser 750 may generate a menu in which the service having a service ID 801="4" capable of processing the request by itself, the cooperating services="2" and "1," and the cooperating services="2" and "3" are all included as options.

Return to the description of the sequence diagram of FIG. 9.

In step S906, the analysis unit 752 of the web browser 750 analyzes the script and HTML for displaying a menu of a plurality of cooperating services generated in step S905 (step S1207 of FIG. 12). The display unit 753 displays the menu. As a result, the web browser 750 displays a screen such as illustrated in FIG. 11A, showing a list of services including a service or services that make a plurality of services cooperate with each other. Unlike the ordinary "display of a list of registered Web Intents" described in step S205 of FIG. 2, the list is displayed before the execution of the ECMAScript for activating the Web Intents.

FIG. 11A illustrates an example of the screen displayed on the web browser 750 of the information processing terminal 530 in step S906 of FIG. 9.

Figure 11B:
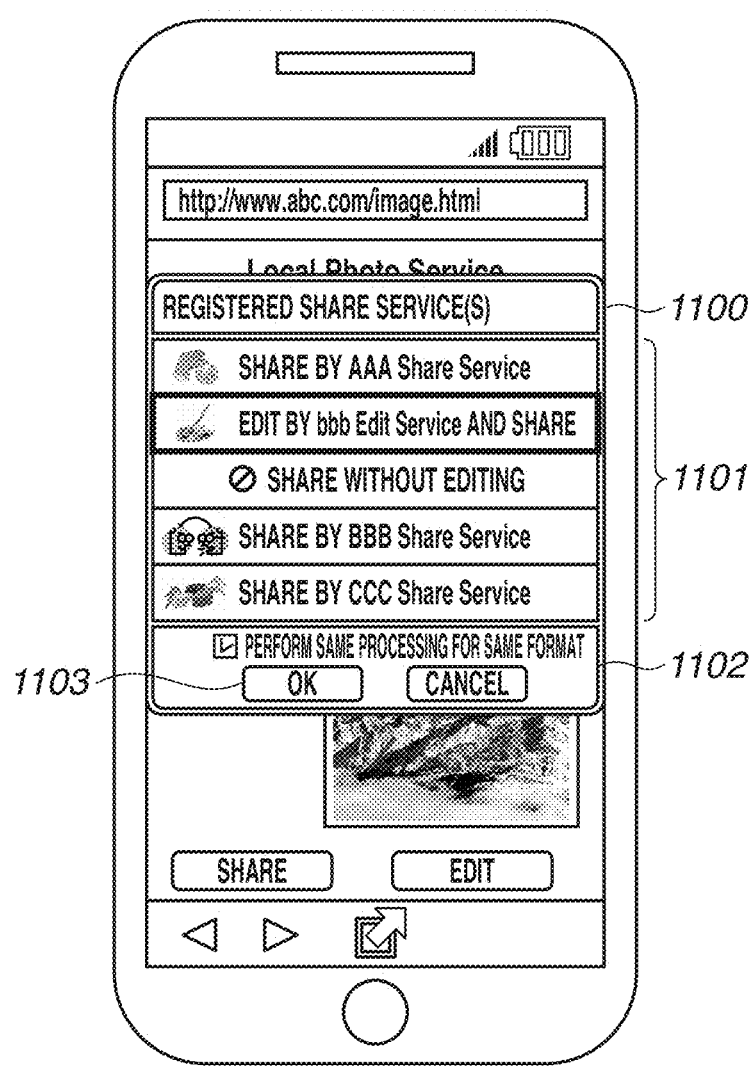

If the user presses the share button 1005, the web browser 750 of the information processing terminal 530 displays, for example, a popup screen 1100. The popup screen 1100 includes a list 1101 of services that are determined to be displayed in step S905 of FIG. 9. Such a list screen displays a service or services that make a plurality of Web Intents services cooperate with each other (for example, "edit by bbb Edit Service and share"). If the user selects "edit by bbb Edit service and share" and presses an OK button 1103 as illustrated in FIG. 11B, each server providing the respective services perform processing in succession. In the example of FIGS. 11A and 11B, "edit by bbb Edit Service and share" is the only service displayed that enables a plurality of Web Intents services to cooperate with each other. If a plurality of services that can change "PNG" into "JPEG" is registered, a plurality of services making a plurality of Web Intents services cooperate is listed.

Consequently, even a service or services that coincide with the requested action but not with the type become usable and available for selection if such services of unsupported types can process the request in cooperation with other services. In the present exemplary embodiment, "bbb Edit Service" corresponds to service 2 provided by the server 251. "AAA Share Service" corresponds to service 1 provided by the server 250.

Return to the description of the sequence diagram of FIG. 9.

If, for example, the web browser 750 detects that the user selects "edit by bbb Edit Service and share" and presses the OK button 1103 as illustrated in FIG. 11B from the list of services displayed in step S906, the web browser 750 performs the processing of step S907.

In step S907, the script processing unit 757 of the web browser 750 analyzes the ECMAScript corresponding to the selected service, and executes the script (Web Intents service execution processing). The script processing unit 757 further generates and manages information for making the cooperating services by including the contents of the Intent object generated by the ECMAScript into transmission data. Such information (including the information about the selected service) is stored in the service information storage unit 758. If the "perform same processing for same format" checkbox 1102 of FIG. 11B is set, the script processing unit 757 performs control so that if the same condition occurs afterwards, the same processing is performed by using the information. Specifically, suppose that the script processing unit 757 receives the same data format from the server 510 and determines that the service needs the same processing (in the present example, "edit"). In such a case, the script processing unit 757 determines that the same service is selected, and advances the processing to step S907 without displaying the list. In the foregoing example, the script processing unit 757 determines that "edit by bbb Edit Service and share" is selected, and advances the processing to step S907 without displaying the list. In other words, if the checkbox 1102 is set, the web browser 750 sets (stores) the action, type of the request and the service (the second service (and the first service)) selected, specified, and used in the list 1101, in association with each other. The web browser 750 subsequently performs control to, if the action and type of a request coincide with the set action and type, request processing by using the service set in association with the action and type.

In the processing performed in the foregoing step S907, the web browser 750 initially executes first script processing that uses the service 521 which provides service (bbb Edit Service). Specifically, the web browser 750 performs control to execute the anonymous function in the first script to generate a new Intent object and call the startActivity( ) function using the new Intent object as an argument. The web browser 750 then manages and stores information for performing second script processing on the web application 730 of the server 520 which provides service 1 (AAA Share Service).

In step S908, after the execution of the anonymous function, the analysis unit 752 of the web browser 750 transmits an acquisition request for image data to the server 510 serving as the client 101 via the communication unit 751 as an HTTP request message. The analysis unit 752 transmits the acquisition request by executing the getImageFrom( ) function called in the anonymous function in the ECMAScript (FIG. 10A). For example, if the radio button 1003 is selected on the screen 1000, the analysis unit 752 issues an acquisition request for "image001.png." In the present exemplary embodiment, the analysis unit 752 issues the acquisition request to the server 510, whereas the analysis unit 752 may be configured to not issue an acquisition request but use the image data in the HTML document that the web browser 750 has already obtained.

In step S909, the content management unit 704 of the server 510 obtains the image data specified by the acquisition request for the image data received in step 908 from the content management table 820 of the database service unit 705. For example, if the filename of the image data specified by the acquisition request for the image data is "image001.png," the content management unit 704 obtains the image data of the first record in the content management table 820. In step S910, the presentation unit 703 of the server 510 transmits the image data obtained in step S909 to the information processing terminal 503 via the communication unit 701 as an HTTP response message.

When the web browser 750 of the information processing terminal 530 receives the image data sent back from the server 510, the web browser 750 advances the processing to step S911. In steps S911 to S913, the server 521 providing "bbb Edit Service" (service 2) is used. The server 521 "edits" (converts) image001.png, which is the image data in the PNG format obtained in step S909, into image001.jpeg in a JPEG format which is the data type usable in the "AAA Share Service" (service 1). A detailed description is given below.

In step S911, the web browser 750 of the information processing terminal 530 transmits a request to the server 521 which provides the services (service 2) selected from the list displayed in step S906. In the present example, the web browser 750 transmits the request to the web application 730 of the server 521. By such processing, the web browser 750 of the information processing terminal 530 includes the contents of the Web Intent object into the transmission data.

The web application 730 of the server 521 receives the request of step S911, and performs step S912. In step S912, the Intent processing unit 732 of the web application 730 of the server 521 extracts the Intent object from the request of step S911, and analyzes the Intent object. The Intent processing unit 732 then starts to process the analyzed intent. In the present exemplary embodiment, the web application 730 of the server 521 interacts with the user via the web browser 750 of the information processing terminal 530 while providing a service for editing the image data included in the Intent object.

For example, the web application 730 of the server 521 generates an HTML document for accepting operations for inputting the filename of the image data and storing it, and transmits the HTML document to the information processing terminal 530. The web browser 750 of the information processing terminal 530 receives the HTML document and displays a user interface (UI). The web browser 750 of the information processing terminal 530 then performs image editing processing according to user instructions, and transmits the resulting processed data to the web application 730 of the server 521. The data is stored in the server 521. In the present exemplary embodiment, the user uses the "edit" function of the server 521 to perform image editing, whereby image001.png in the PNG format is data-converted into image001.jpeg in the JPEG format. image001.jpeg is stored and managed by using the content management table 820 of the database service unit 735.

In step S913, after the end of the processing of the Intent, the web application 730 of the server 521 sends back a response including ECMAScript for notifying the Web Intents client of the processing result. In the present example, the web application 730 sends back data including "image001.jpeg" as the edit-processed image data to the web browser 750 of the information processing terminal 530. By such processing, the content processing unit 734 of the server 521 sends back the image data with the image type and filename specified by the user, which are stored and managed in the content management table 820 of the database service unit 735.

In step S914, the script processing unit 757 of the information processing terminal 530 performs processing for calling the server 520 which provides the service (service 1). The service that comes second has the "share" function. Such processing uses "image001.jpeg" obtained in the foregoing step S913 as a call parameter of the service 1.

In step S915, the web browser 750 of the information processing terminal 530 transmits a request to the server 530 which provides the service that comes second among the services displayed and selected by the user in step S906. In such a manner, the web browser 750 issues a processing request to the web application 730 of the server 520 subsequent to the first script processing of the server 521 in steps S911 to S913.

The web application 730 of the server 520 receives the request of step S915, and performs the processing of step S916. In step S916, the Intent processing unit 732 of the web application 730 of the server 520 extracts the Intent object from the request received in step S915, and analyzes the Intent object. The Intent processing unit 732 then starts to process the analyzed Intent. In the present exemplary embodiment, the web application 730 of the server 520 interacts with the user via the web browser 750 of the information processing terminal 530. The web application 730 provides the "share" service for sharing the image data included in the Intent object.

For example, the web application 730 of the server 520 generates an HTML document for accepting operations for inputting the filename of the image data and storing it, and transmits the HTML document to the information processing terminal 530. The web browser 750 of the information processing terminal 530 receives the HTML document, and displays an UI. When the web browser 750 of the information processing terminal 530 detects a "share" operation by the user, the web browser 750 transmits a share request for the image data to the web application 730 of the server 520. When the web application 730 of the server 520 receives the share request for the image data, the content processing unit 734 registers the image data in the content management table 820 of the database service unit 735 with the filename specified by the user.

In step S917, after the end of the processing of the Intent, the web application 730 of the server 520 sends back a response including ECMAScript for notifying the client (server 510) of the processing result to the web browser 750 of the information processing terminal 530.

The web browser 750 of the information processing terminal 530 receives the response of step S917, and performs the processing of step S918. In step S918, the web browser 750 of the information processing terminal 530 executes the ECMAScript included in the response to call the callback function specified by an argument of the startActivity( ) function in the foregoing first script. For example, in FIG. 10A, the web browser 750 executes the callback function onSuccess( ).

In step S919, the web browser 750 of the information processing terminal 530 sends back a Web Intent processing result to the web application 700 of the server 510 providing the client 101, by using the callback function.

The web application 700 of the server 510 receives the Web Intent processing result of step S919, and performs the processing of step S920. In step S920, the presentation unit 703 of the web application 700 of the server 510 generates an end page of the Web Intents processing as an HTML document. The end page notifies the end of the processing of the Intent.

In step S921, the presentation unit 703 of the web application 700 of the server 510 transmits the end page of the Web Intents processing generated in step S920 to the information processing terminal 530 via the communication unit 701.

The web browser 750 of the information processing terminal 530 receives the end page of the Web Intents processing of step S921, and performs the processing of step S922. In step S922, the display unit 753 of the web browser 750 of the information processing terminal 530 displays the end page of the Web Intents processing received in step S921.

Figure 13:
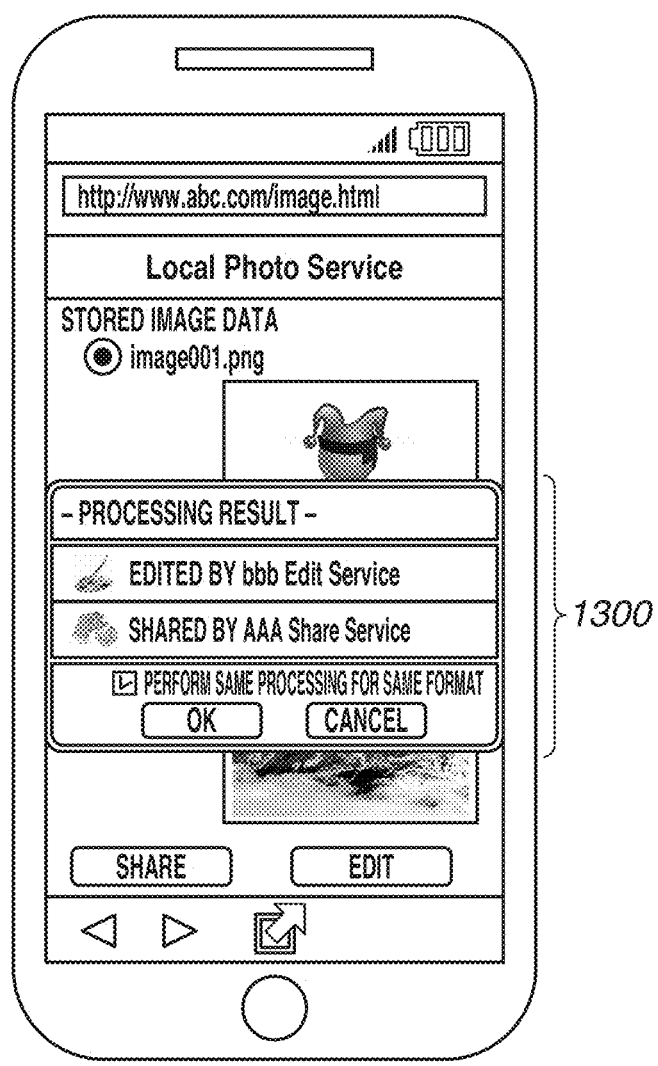
FIG. 13 is a diagram illustrating an example of a Web Intents processing end page displayed by the UA.

FIG. 13 is a diagram illustrating an example of the end page of the Web Intents processing.

In FIG. 13, the end page 1300 of the Web Intents processing displays the processing results of the respective services. The processing results indicate that the "image editing" (conversion) of the share-instructed image data from "PNG" to "JPEG" has been completed by the second service "bbb Edit Service" and the image sharing has been completed by the first service "AAA Share Service." In other words, if the requested processing has succeeded, the web browser 750 displays that the share-instructed data has been processed by the second service and that the data processed by the second service has been processed by the first service. In such a manner, the web browser 750 displays the processing result of the requested processing with respect to each function called by using the function information (for example, FIG. 13 and FIG. 17A to be described below).

In the present exemplary embodiment, the mechanism by which the web browser 750 of the information processing terminal 530 provides a plurality of services for the client has been described. By the foregoing processing, the user can easily use services that do not support the data type via the web browser 750 of the information processing terminal 530.

In the present exemplary embodiment, the configuration of the servers and apparatuses, the configuration of the software modules, and the processing flow for using a service different from the type 803 of the request for converting the image data have been described. The configurations and the processing flow are just an example and not limited to them.

For example, the types 803 which are data-converted may be subjected to the conversion into formats other than formats of image data such as JPEG and PNG. Applicable examples include format conversions defined by Multipurpose Internet Mail Extensions (MIME) types defined in request for comments (RFC) 2045, RFC 2046, RFC 2047, RFC 2048, and RFC 2049. Applicable examples further include various types of data including application data, moving image data, sound data, music data, and address book data. Even with such data, a service according to the action intended by the user can be used by appropriately using a plurality of services (even three or more services) through service cooperation even if, for example, its type is different from the requested one.

In the present exemplary embodiment, the server 510 has been described that implements a website providing an image and a social button. The servers 520 and 521 have been described that provide a website providing the functions of editing, storing, and sharing image data. However, the server 510 may be applied to an image forming apparatus. The servers 520 and 521 may be applied to a managed print service (MPS) such as a print server.

By the foregoing processing, the second service and the first service are made to cooperate with each other so that the second service converts relevant data into data supported by the first service. Data not supported by the first service can thus be processed by Web Intents. In such a manner, even if the type of the data stored in the client 101 is different from the data type processable by a service, the service can be easily used without troubling the user.

The foregoing first exemplary embodiment has dealt with the configuration in which the web browser 750 functioning as the UA 106 makes a second service cooperate with a first service and arranges the plurality of services to deal with requests. A second exemplary embodiment describes a configuration in which the web browser 750 serving as the UA 106 passes the processing method of the first service to the second service, whereby the plurality of services are made to cooperate with each other and perform the processing. A description of configurations and processing corresponding to those of the first exemplary embodiment is the same as in the first exemplary embodiment and will thus be omitted.

An operation in which the information processing terminal 530 accesses a website provided by the server 510 and mediates Intent processing requests between services 1 and 2 provided by the servers 520 and 521 will be described below with reference to the sequence diagram of FIG. 14.

Figure 14:
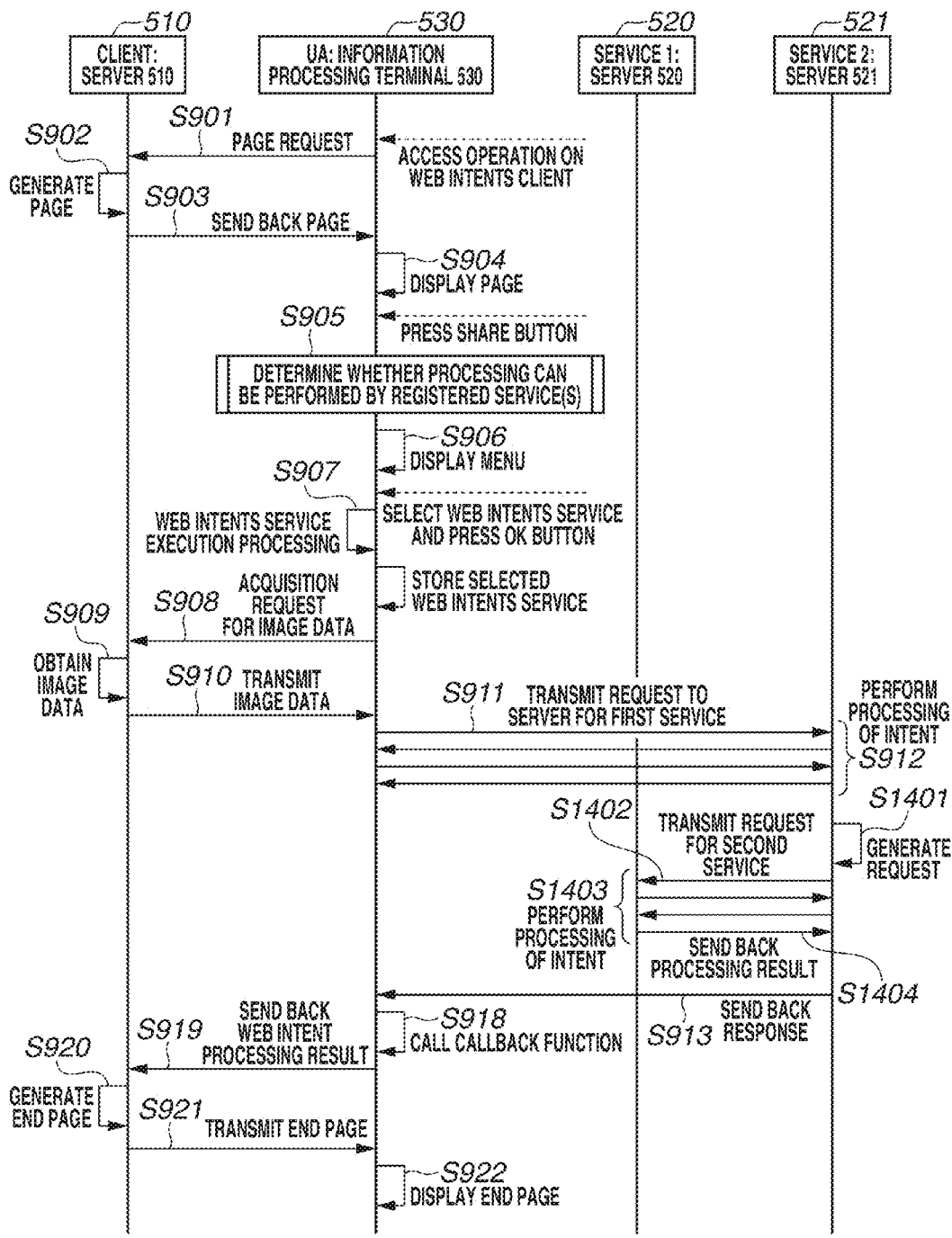
FIG. 14 is a sequence diagram illustrating an operation related to the provision of a service using Web Intents according to a second exemplary embodiment.

FIG. 14 is a sequence diagram illustrating an example of the operation related to the provision of a service by using Web Intents according to the second exemplary embodiment. In the following description, elements that are similar to those in the first embodiment are given the same reference numerals, and description of the elements is omitted.

In step S911, the web browser 750 of the information processing terminal 530 transmits a request to the server 521 which provides the service (service 2) that comes first among the services selected from the list displayed in step S906. In the present example, the web browser 750 makes the request to the web application 730 of the server 521. In such processing, the web browser 750 of the information processing terminal 530 includes the contents of the Web Intent object into the transmission data. Here, the web browser 750 further includes in the transmission data the information for identifying the contents of the Intent processing of the cooperating service that comes second, like 1552 of FIG. 15B to be described below. If input information is needed to use the service that comes second, the web browser 750 may include the needed input information in the transmission data. For example, if authentication information is needed, the web browser 750 includes the authentication information in the transmission data. If a filename is needed to store the image data, the web browser 750 includes the filename in the transmission data.

The web application 730 of the server 521 receives the request of step S911, and performs step S912. In step S912, the Intent processing unit 732 of the web application 730 of the server 521 extracts the Intent object from the request of step S911 and analyzes the Intent object. The Intent processing unit 732 starts to process the analyzed Intent. In the present exemplary embodiment, the web application 730 of the server 521 performs image editing by the "edit" function to convert "image001.png" in the PNG format into "image001.jpeg" in the JPEG format.

In step S1401, after the end of the processing of the Intent, the Intent processing unit 732 of the server 521 generates a request including ECMAScript so that the processing result is processed by the next server 520. In the present exemplary embodiment, a Web Intents request including "image001.jpeg" as the edit-processed image data is included.

In step S1402, the Intent processing unit 732 of the server 521 performs Web Intents transmission processing with respect to the second server 520. In this step S1402, the Intent processing unit 732 processes image001.jpeg obtained by the processing step S912 as a call parameter of the second server 520.

In step S1403, the Intent processing unit 732 of the web application 730 of the server 520 extracts the Intent object from the request received by the processing of the foregoing step S1402 and analyzes the Intent object. The Intent processing unit 732 of the server 520 processes the analyzed Intent. In the present exemplary embodiment, the web application 730 of the server 520 provides the "share" service by which the image data included in the Intent object is shared.

Specifically, the web application 730 of the server 520 receives a request to store the image data of "image001.jpeg" transmitted in step S1402. The content processing unit 734 then registers the image data with the filename specified by the user in the content management table 820 of the database service unit 735.

In step S1404, after the end of the processing of the Intent in the foregoing step S1403, the web application 730 of the server 520 sends back the processing result to the Intent processing unit 732 of the server 521.

In step S913, the Intent processing unit 732 of the web application 730 of the server 521 analyzes the processing result of the Intent sent back in the foregoing step S1404, and performs reply processing corresponding to the processing of the foregoing step S911. In this reply processing, a response including ECMAScript notified to the client (server 510) is sent back. In the present example, the Intent processing unit 732 sends back the data including the share-processed HTML document.

Figure 15A:
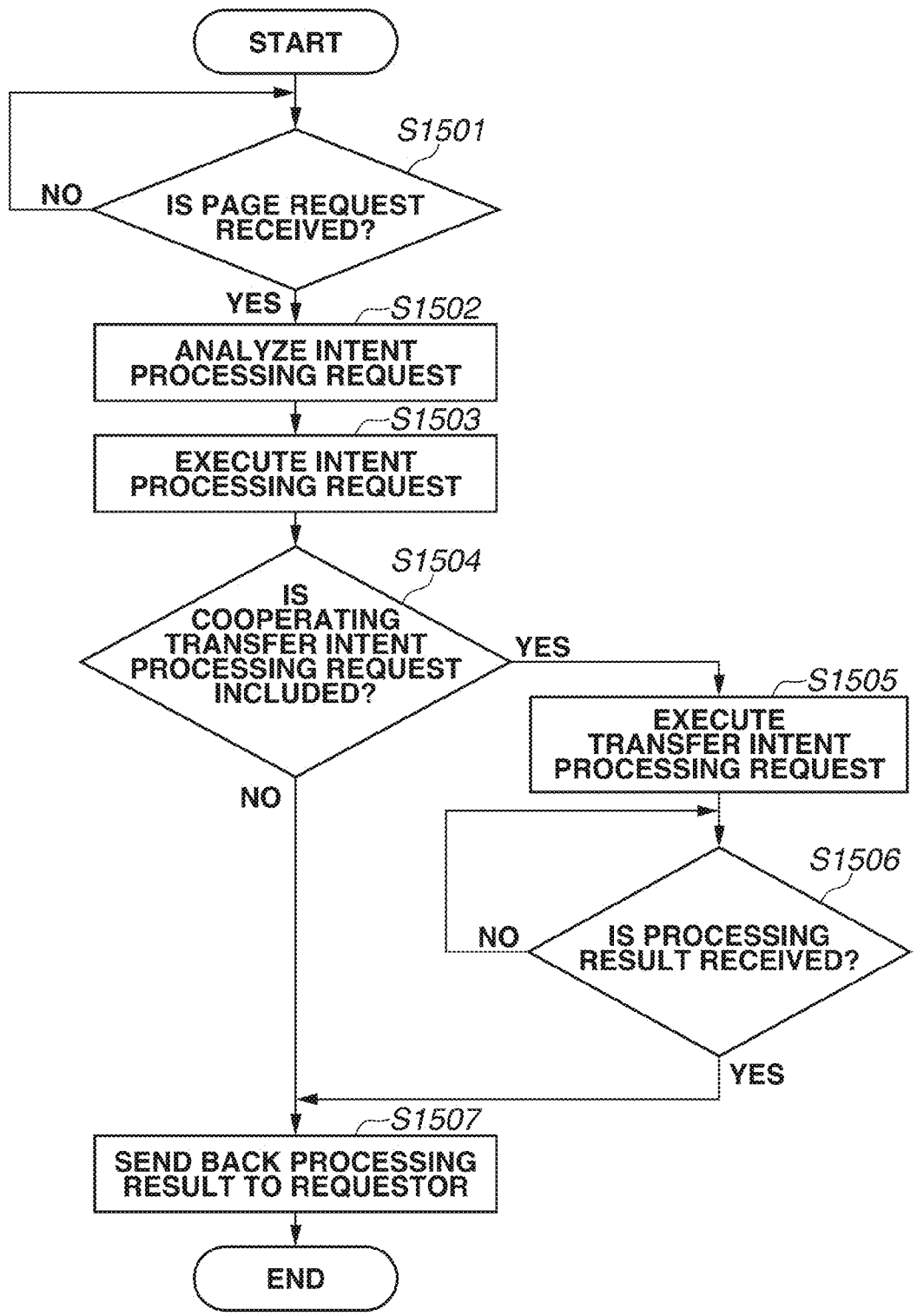

FIG. 15A is a flowchart for describing the processing of steps S912, S1401, S1402, S1403, S1404, and S913 in FIG. 14 which the Intent processing unit 732 of the server 521 performs. The processing of steps S912, S1401, S1402, S1403, S1404, and S913 of FIG. 14 will be described in more detail below with reference to FIG. 15A.

In step S1501, the presentation unit 733 of the web application 730 of the server 521 monitors whether a page request is received via the communication unit 701. If a page request (step S911) is determined to be received (YES in step S1501), the presentation unit 733 advances the processing to step S1502.

In step S1502, the Intent processing unit 732 of the server 521 analyzes the Intent processing request. The Intent processing unit 732 obtains execution parameters of the service such as action and type from ECMAScript 1550 (for example, FIG. 15B) transmitted from the web browser 750 of the information processing terminal 530. If the Intent processing request includes such extra data as illustrated by 1551 in FIG. 15B, the Intent processing unit 732 of the server 521 obtains from the extra data parameters for performing execution processing on the cooperating service.

In step S1503, the Intent processing unit 732 of the server 521 executes the Intent processing request based on the execution parameters of the service obtained in step S1502. This processing corresponds to the processing step S912 illustrated in FIG. 14. In the present exemplary embodiment, the server 521 performs the processing of "bbb Edit Service" having an action 802 of "edit" and a type 803 of "image/*." Specifically, the server 521 performs edit processing from the data of "image001.png" into the data of "image001.jpeg."

In step S1504, the Intent processing unit 732 of the server 521 determines whether a cooperating transfer Intent processing request is included. If parameters for performing execution processing on a cooperating service such as the extra data 1551 of FIG. 15B are included, the Intent processing unit 732 determines that a cooperating transfer Intent processing request is included (YES in step S1504), and advances the processing to step S1505. On the other hand, if no parameter for performing execution processing on a cooperating service such as the extra data 1551 is included, the Intent processing unit 732 determines that no cooperating transfer Intent processing request is included (NO in step S1504), and advances the processing to step S1507.

In step S1505, the Intent processing unit 732 of the server 521 executes the transfer Intent processing request for the cooperating service (here, provided by the server 520) by using the parameters obtained in the foregoing step S1502. In the present exemplary embodiment, the server 520 executes "AAA Share Service" having an action 802 of "share" and a type 803 of "image/jpeg." This processing corresponds to the processing step S1401 illustrated in FIG. 14.

In step S1506, the Intent processing unit 732 of the server 521 receives and processes the processing result of the service executed by the server 520 according to the request of step S1505. This processing corresponds to the foregoing processing step S1404.

In step S1507, the Intent processing unit 732 of the server 521 sends back the processing result received from the server 520 (or the processing result of step S1503) to the web browser 750 of the requesting information processing terminal 530. This processing corresponds to the processing step S913 illustrated in FIG. 14.

An example of the ECMAScript generated by the web browser 750 of the information processing terminal 530 will be described with reference to FIG. 15B.

FIG. 15B is a diagram illustrating an example of the ECMAScript generated by the web browser 750 of the information processing terminal 530. Such a script is generated in step S911 illustrated in FIG. 14. The script illustrated in FIG. 15B is just an example. Other formats and notations may be used as long as the web browser 750 serving as the information processing terminal 530 can interpret the script.

The ECMAScript 1550 is almost the same as the ECMAScript of FIG. 4. Only differences will be described below.

The extra data 1551 describes information 1552 for identifying the contents of the cooperating second Intent processing for the server 521 to perform. Specifically, the extra data 1551 specifies parameters for the Intent processing unit 732 of the server 521 to perform execution processing on the Intent processing unit 732 of the server 520. The parameters describe information for identifying the service and for executing Web Intents. For example, parameters such as ForwardAction, ForwardType, ForwardTitle, ForwardHref, ForwardDisposition, and ForwardBaseURI are specified.

The processing for generating the ECMAScript 1550 for making Web Intent services cooperate with each other is performed when the user presses the "share" button 1005 on the screen displayed in step S904 of FIG. 14.

In step S905 of FIG. 14, the web browser 750 of the information processing terminal 530 initially obtains the registered service table 800. The script processing unit 757 then selects a second service needed for the first service stored in the service information storage unit 758 to perform processing, and determines the action 802 and the type 803 needed to use the second service. In the example of the ECMAScript 1550, the web browser 750 of the information processing terminal 530 initially performs processing having an action 802 of "edit" and a type 803 of "image/*" on the server 521. The server 521 then performs processing having an action 802 of "share" and a type 803 of "image/jpeg" on the server 520.

When performing a plurality of types of Web Intents cooperation processing, information for identifying a plurality of transfer services and Web Intents processing may be written as parameters in the extra data 1551. For example, parameters for performing Web Intents processing such as "ForwardAction":["http://webintents.org/edit", "http://webintents.org/share",], "ForwardType":["image/*", "image/jpeg"], and "ForwardBaseURI":["http://bbb111.com", "http://ccc111.com"] may be written.

In this example, the Intent processing unit 732 of the first server providing the first service performs its Web Intents processing before performing the cooperating Web Intents processing specified by the extra data 1551. As the cooperating Web Intents processing, the Intent processing unit 732 then generates parameters for performing the "edit" processing, and parameters for performing the "share" processing on "http://ccc111.com" as the extra data 1551. The Intent processing unit 732 transmits the parameters to the service that comes second, i.e., "http://bbb111.com."

The Intent processing unit 732 of the second server providing the service that comes second ("http://bbb111.com,") performs the "edit" processing of the Web Intents processing, and then performs the cooperating Web Intents processing specified by the extra data 1551. Specifically, the Intent processing unit 732 generates and transmits parameters for performing the "share" processing to the service that comes third ("http://ccc111.com.") The third server providing the service that comes third ("http:///ccc111.com,") then executes the Web Intents processing of "share."

In the present exemplary embodiment, the web browser 750 of the information processing terminal 530 generates the parameters for the second server that performs the "edit" processing, or the second service, and the parameters for the first server that performs the "share" processing, or the first service. The web browser 750 transmits the parameters to the second server. The servers then cooperate with each other to perform the services by using the parameters, whereby the Intent processing can be performed in a cooperative manner. As a result, the plurality of cooperating Web Intents services can cooperate with each other without the intermediary of the web browser 750 of the information processing terminal 530 between the services. While the present exemplary embodiment has dealt mainly with an example of the method for making two services cooperate, three or more services can cooperate with each other in the similar processing.

When a plurality of cooperating services is used to perform Web Intents processing, the processing selected by the user may fail to be completed due to a failure of the processing of a service. A third exemplary embodiment deals with a processing method for such a situation, and a method for selecting services to cooperate with. A description of configurations and processing corresponding to those of the foregoing first and second exemplary embodiments is the same as in the first and second exemplary embodiments and will thus be omitted.

An operation performed when the information processing terminal 530 performs Intent processing of the server 521 and the processing fails will be described below with reference to the sequence diagram of FIG. 16.

Figure 16:
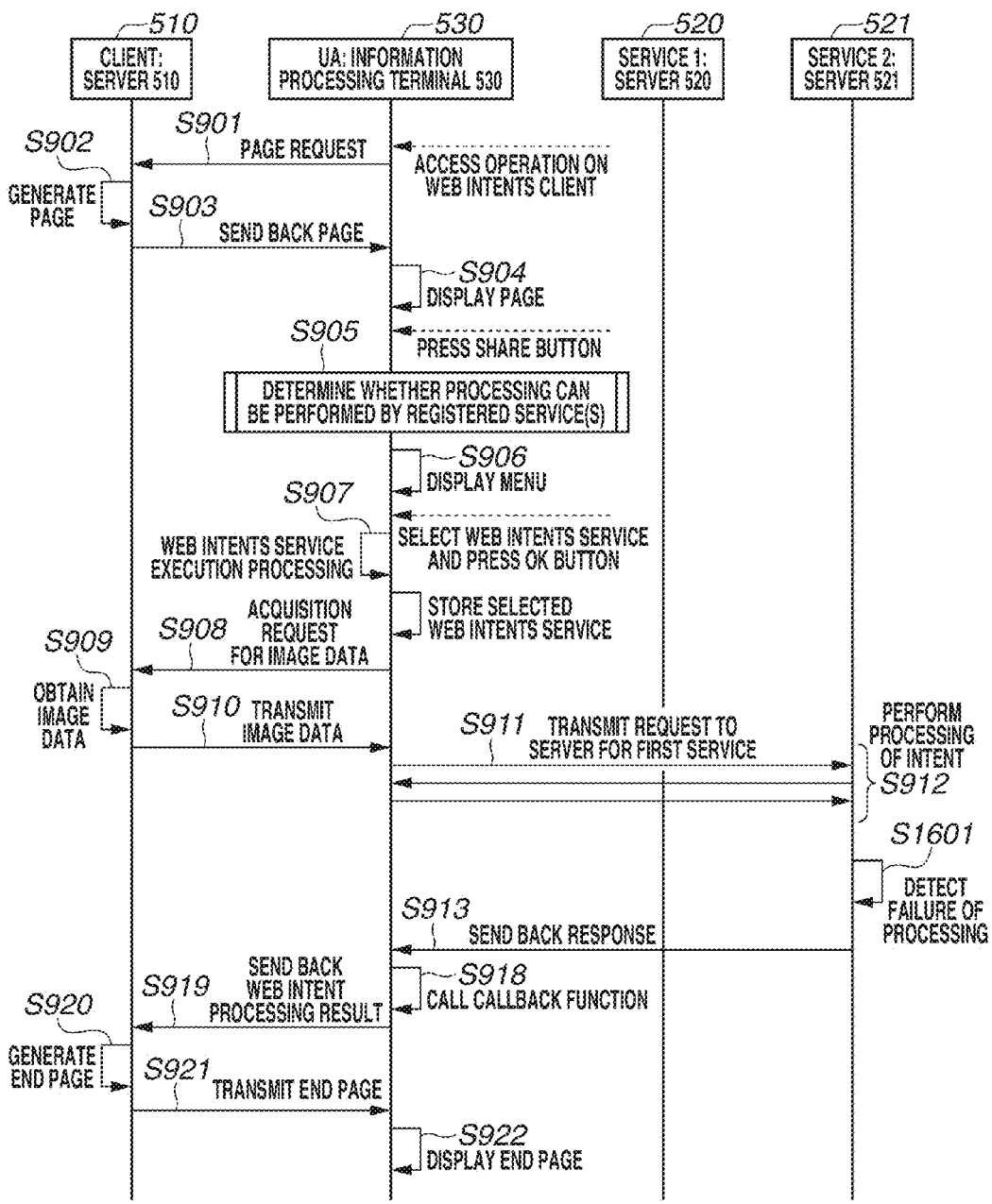
FIG. 16 is a sequence diagram illustrating an operation related to the provision of a service using Web Intents according to the second exemplary embodiment.

FIG. 16 is a sequence diagram illustrating an example of the operation related to the provision of a service using Web Intents according to the third exemplary embodiment. In the following description, elements that are similar to those in the first embodiment are given the same reference numerals, and description of the elements is omitted.

In steps S911 to S913, the web browser 750 of the information processing terminal 530 performs Web Intents processing. In step S912, the Intent processing unit 732 of the web application 730 of the server 521 extracts the Intent object from the processing request received in step S911, and analyzes the Intent object. The Intent processing unit 732 processes the analyzed Intent. In the present exemplary embodiment, the web application 730 of the server 521 performs image editing by the "edit" function to convert "image001.png" in the PNG format into "image001.jpeg" in the JPEG format.

In step S1601, the web application 730 of the server 520 determines the processing result of the Intent in the processing of step S912. If the processing result is a failure, for example, when the Intent processing unit 732 fails in the image conversion or when the memory runs short, the web application 730 detects the failure of the processing. If a failure of the processing is detected in step S1601, then in step S913, the Intent processing unit 732 of the web application 730 of the server 521 analyzes the result of the processing of the Intent in step S912, and performs reply processing corresponding to the processing of step S911. In the reply processing, a response including ECMAScript to be notified to the client (server 510) is sent back to the web server 750 of the information processing terminal 530. In the present example, the Intent processing unit 732 sends back HTML data including the error result of the "edit" processing.

In step S918, the web browser 750 of the information processing terminal 530 executes the ECMAScript included in the response from the foregoing server 521, and calls the callback function specified by an argument of the startActivity( ) function in the first script for calling the service that comes first. In the present exemplary embodiment, in step S913, the server 521 sends back a script including the error result of the "edit" processing. For example, the web browser 750 executes the callback function "onError( )" in the ECMAScript illustrated in FIG. 10A.

In step S919, the web browser 750 of the information processing terminal 530 sends back the result of the Web Intents processing to the web application 700 of the server 510 by using a callback function.

In step S920, the presentation unit 703 of the web application 700 of the server 510 generates an end page as an HTML document. The end page is a page for notifying of the failure of the processing of the Intent. In step S921, the presentation unit 703 of the web application 700 of the server 510 transmits the page (processing failure page) notifying of the failure of the processing, generated in step S920, to the information processing terminal 530 via the communication unit 701.

In step S922, the web browser 750 of the information processing terminal 530 displays the processing failure page notifying of the failure of the Web Intents processing received in the processing step S921.

Figure 17A:
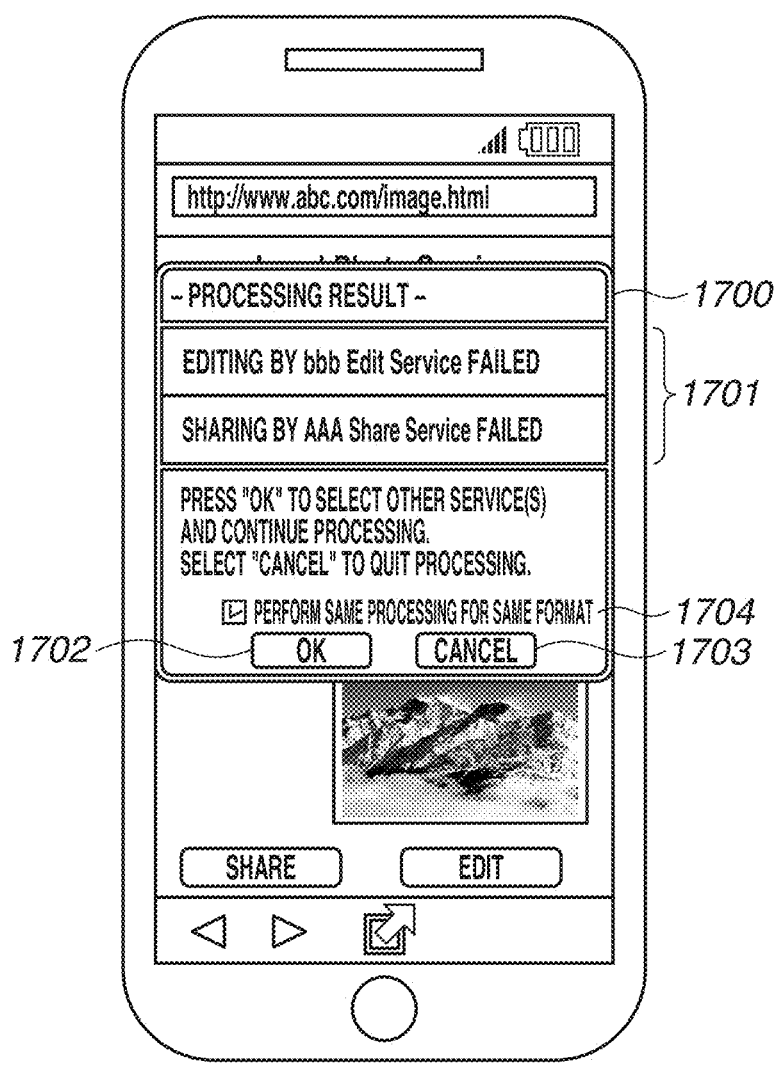
FIGS. 17A and 17B are diagrams illustrating an example of the Web Intents processing end page displayed by the UA.

FIG. 17A is a diagram illustrating an example of the processing failure page. A popup screen 1700 displays the processing results of each server. A processing result display part 1701 shows that the "image editing" (conversion) of the share-instructed image data from "PNG" into "JPEG" by the second service "bbb Edit Service" has failed. The processing result display part 1701 further shows that the image sharing by the first service "AAA Share Service" has not been completed due to the conversion failure. In other words, if the processing of the second service has failed, the web browser 750 displays a message indicating that the processing of the share-instructed data by the second service has failed and that the processing of the data by the first service has not been completed due to the failure.

Suppose that the user presses an "OK" button 1702 on the processing failure page illustrated in FIG. 17A. Then in step S904 of FIG. 16, the user presses the share button and the screen transitions to the one for selecting a service. On the other hand, if the user presses a "cancel" button 1703 on the processing failure page illustrated in FIG. 17A, the web browser 750 stops processing and does not proceed to the subsequent processing. If a "perform same processing for same format" checkbox 1704 in FIG. 17A is set, the web browser 750 subsequently performs the same processing by using the foregoing information when the same condition occurs.

Figure 17B:
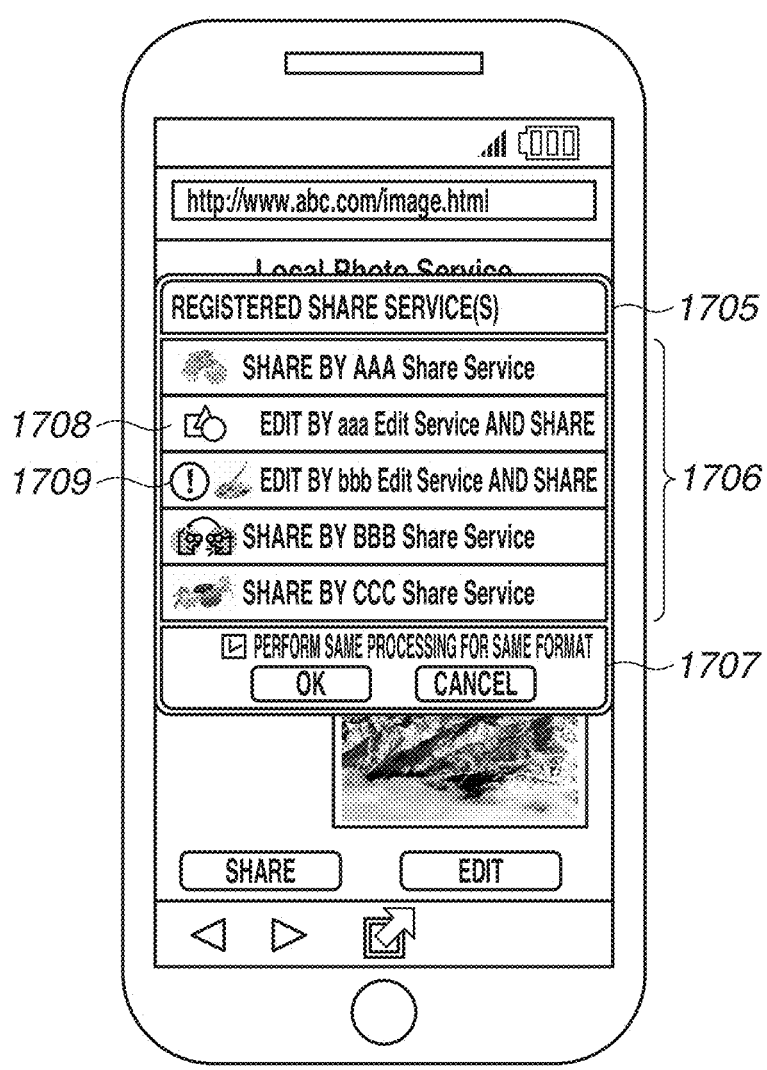

FIG. 17B illustrates an example of the screen for selecting a service when the "OK" button 1702 is pressed on the processing failure page illustrated in FIG. 17A.

If the "OK" button 1702 is pressed, the web browser 750 of the information processing terminal 530 displays a popup screen 1705, for example. A list 1706 of services is displayed in the processing step S905 of FIG. 16. In other words, if an error occurs in the requested processing, the web browser 750 accepts designation of a service from the user again.

The example of FIG. 17B is an screen example where the web browser 750 displays "edit by aaa Edit Service and share" 1708 and "edit by bbb Edit Service and share" 1709 on the list 1706. The selection screen (list) 1706 displays "edit by aaa Edit Service and share" 1708 on a priority basis, and displays "edit by bbb Edit Service and share" 1709 as a second candidate on the menu. The script processing unit 757 determines the priority by referring to the registered service table 800 (FIG. 18) of the web browser 750 of the information processing terminal 530.

FIG. 18 is a diagram illustrating an example of the registered service table 800 according to the third exemplary embodiment. A registration date 1801 shows the date and time of registration of the Web Intents service. A count 1802 shows the number of times the Web Intents service has been used in the past.

As an example of the method for determining the priority, the registration date 1801 of the Web Intents service is considered, and newer or older services are displayed on a priority basis. Alternatively, the priority may be determined according to the counts 1802 that is the numbers of times the Web Intents services have been used. Aside from the numbers of times the services have been used, the use frequencies of the services may be registered in the registered service table 800. In such a case, the priority may be determined according to the use frequencies of the services.

The web browser 750 determines the processing that has caused an error in the past from a status 1910 (FIG. 19) that is the execution result of the Web Intent, and displays an error indication (!) 1709 in "Edit by bbb Edit Service and Share" (see FIG. 17B). More specifically, when the web browser 750 accepts designation of a service from the user, the web browser 750 displays information indicating the occurrence of an error in the past with respect to services of which the error occurrence is stored in a Web Intent execution log illustrated in FIG. 19. The web browser 750 can hide the error-occurring service(s) from the menu list (list 1706). If a "perform same operation for same format" checkbox 1707 in FIG. 17B is set, the web browser 750 subsequently performs the same operation when the same condition afterwards occurs, by using the past information about the execution of such processing.

FIG. 19 is a diagram illustrating an example of the Web Intent execution log of the UA 106.

A log ID 1901 is an ID for uniquely identifying Web Intent processing of the UA 106. An action 1902 is information indicating the function or service of the server 520 or 521. A type 1903 shows what data format can be used for the action 1902. A href 1904 shows the absolute URL of the service provided by the server 520 or 521. A title 1905 shows the title of the service provided by the server 520 or 521. A disposition 1906 shows how the service provided by the server 520 or 521 is displayed. A registration date 1907 shows the date and time of registration of the Web Intents service. A transaction 1908 indicates a server processing series that the UA 106 has processed according to a request of the same user. An input data type 1909 shows the type of data specified as an input parameter of the processing. A status 1910 shows the result of execution of the Web Intent. The Web Intent execution log of the UA 106 illustrated in FIG. 19 is stored in the service information storage unit 758 or other storage areas of the HDD 606 of the information processing terminal 530.

The present exemplary embodiment deals with the configuration in which when a plurality of cooperating servers performs Web Intents processing, if the user-selected processing has not been completed due to a failure of the processing of a server, the failure of the processing is displayed to the user. In addition, the configuration for displaying and determining the priority of the cooperating servers has also been described.

In such processing, if an error occurs in the plurality of cooperating services, the user can easily recognize the error and select other Web Intents services for processing. Accordingly, even if the type of the data stored in the client is different from that of the data processable by a service, the desired service can be easily carried out by making a plurality of services cooperate with each other without troubling the user.

According to the exemplary embodiments of the present invention, a service that cannot process the type of data provided by a Web Intents client which manages the data can be easily selected and used in cooperation with other services.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. It will of course be understood that this invention has been described above by way of example only, and that modifications of detail can be made within the scope of this invention.

This application claims the benefit of Japanese Patent Application No. 2013-173228 filed Aug. 23, 2013, which is hereby incorporated by reference herein in its entirety.

What is claimed is:

1. An information processing terminal comprising,
a memory storing instructions; and
a processor which can execute the instructions causing the information processing terminal to execute a relay function of making a client which manages data and a service which provides a function using the data managed by the client cooperate with each other via a network,
wherein the relay function:
receives, from a service of a plurality of services, data including function information for calling a function provided by the service, wherein, in the function information, an action category of the provided function, a processable type of the provided function and a connection destination of the provided function are defined;
performs registration processing for registering the function information based on the received data from the service;
performs a page request of page data to the client;
displays a page based on the page data obtained in response to the page request, wherein the page includes information related to specific data managed by the client and each action category;
obtains, when a user instructs a first action category for the specific data via the displayed page, first function information belonging to the first action category from the registered information by the registration processing;
identifies, from the registered information by the registration processing, second function information for calling a second function for converting into a processable type of a first function called by using the first function information;
obtains the identified second function information belonging to a second action category different from the first action category from the registered information by the registration processing;
displays a list based on the obtained first function information and the identified and obtained second function information;
performs a data request for the specific data to the client when the user instructs a selection for using the second function information via the displayed list;
issues, after the specific data has been obtained from the client in response to the data request, a first request for processing the converted specific data by the second function called by using the second function information, with the first function called by using the first function information; and
receives a result of the processing based on the issued first request,
wherein, when the requested processing fails due to the second function, a message indicating that the processing of the specific data has failed due to the second function and that the processing of the converted specific data with the first function has not been completed is displayed as the results of the processing.

2. The information processing terminal according to claim 1, wherein the relay function further issues a second request for processing the specific data with the second function, to a second service which provides the second function,
issues, after the issuance of the second request, the first request for processing the converted specific data with the first function to a first service which provides the first function, and
receives the processing result based on the issued first request from the first service.

3. The information processing terminal according to claim 1, wherein the relay function issues the first request including information for processing the specific data with the second function and information for processing the converted specific data with the first function called by using the first function information, to a second service which provides the second function, and
receives the processing result based on the issued first request from the second service.

4. The information processing terminal according to claim 1, wherein the relay function displays the results of the processing based on the first issued request with respect to each function called by using the function information.

5. The information processing terminal according to claim 1, wherein the network is the Internet.

6. The information processing terminal according to claim 1, wherein at least two of the client, the service, and the relay function are functions running on the same apparatus.

7. The information processing terminal according to claim 1, wherein the first action category includes at least any one of a category of sharing the specific data, a category of editing the specific data, a category of viewing the specific data, a category of obtaining the specific data from an external service, a category of subscribing the specific data, and a category of storing the specific data and wherein the second action category is a category of editing the specific data.

8. The information processing terminal according to claim 1, wherein the relay function is provided as a function of an operating system or a web browser of the information processing terminal.

9. A method for controlling an information processing terminal having a memory storing instructions and a processor which can execute the instructions causing the information processing terminal to execute a relay function of making a client which manages data and a service which provides a function using the data managed by the client cooperate with each other via a network, the method comprising:
performing the relay function, via the processor of the information processing terminal, wherein the relay function:
receives, from a service of a plurality of services, data including function information for calling a function provided by the service, wherein, in the function information, an action category of the provided function, a processable type of the provided function and a connection destination of the provided function are defined;
performs registration processing for registering the function information based on the received data from the service;
performs a page request of page data to the client;
displays a page based on the page data obtained in response to the page request, wherein the page includes information related to specific data managed by the client and each action category;
obtains, when a user instructs a first action category for the specific data via the displayed page, first function information belonging to the first action category from the registered information by the registration processing;
identifies, from the registered information by the registration processing, second function information for calling a second function for converting into a processable type of a first function called by using the first function information;
obtains the identified second function information belonging to a second action category different from the first action category from the registered information by the registration processing;

displays a list based on the obtained first function information and the identified and obtained second function information;

performs a data request for the specific data to the client when the user instructs a selection for using the second function information via the displayed list;

issues, after the specific data has been obtained from the client in response to the data request, a first request for processing the converted specific data by the second function called by using the second function information, with the first function called by using the first function information; and receives a processing result based on the issued first request, wherein, when the requested processing fails due to the second function, a message indicating that the processing of the specific data has failed due to the second function and that the processing of the converted specific data with the first function has not been completed is displayed as the results of the processing.

10. A non-transitory computer readable storage medium on which is stored a computer program for making a computer execute a method for an information processing terminal having a memory storing instructions and a processor which can execute the instructions causing the information processing terminal to execute a relay function of making a client which manages data and a service which provides a function using the data managed by the client cooperate with each other via a network, the method comprising:

performing the relay function, via the processor of the information processing terminal, wherein the relay function:

receives, from a service of a plurality of services, data including function information for calling a function provided by the service, wherein, in the function information, an action category of the provided function, a processable type of the provided function and a connection destination of the provided function are defined;

performs registration processing for registering the function information based on the received data from the service;

performs a page request of page data to the client;

displays a page based on the page data obtained in response to the page request, wherein the page includes information related to specific data managed by the client and each action category;

obtains, when a user instructs a first action category for the specific data via the displayed page, first function information belonging to the first action category from the registered information by the registration processing;

identifies, from the registered information by the registration processing, second function information for calling a second function for converting into a processable type of a first function called by using the first function information;

obtains the identified second function information belonging to a second action category different from the first action category from the registered information by the registration processing;

displays a list based on the obtained first function information and the identified and obtained second function information;

performs a data request for the specific data to the client when the user instructs a selection for using the second function information via the displayed list;

issues, after the specific data has been obtained from the client in response to the data request, a first request for processing the converted specific data by the second function called by using the second function information, with the first function called by using the first function information; and receives a processing result based on the issued first request, wherein, when the requested processing fails due to the second function, a message indicating that the processing of the specific data has failed due to the second function and that the processing of the converted specific data with the first function has not been completed is displayed as the results of the processing.

* * * * *